(12) United States Patent
Ooyama et al.

(10) Patent No.: US 6,494,805 B2
(45) Date of Patent: Dec. 17, 2002

(54) CONTINUOUSLY VARIABLE TRANSMISSION SYSTEM FOR VEHICLE

(75) Inventors: Kazuo Ooyama, Wako (JP); Kunitoshi Shibasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/912,554

(22) Filed: Jul. 26, 2001

(65) Prior Publication Data

US 2002/0025876 A1 Feb. 28, 2002

(30) Foreign Application Priority Data

Jul. 27, 2000 (JP) .......................... 2000-226736

(51) Int. Cl.$^7$ ............................................. F16H 37/02
(52) U.S. Cl. ...................... 475/207; 475/216; 475/218
(58) Field of Search ................................ 475/207, 211, 475/214, 215, 216, 218

(56) References Cited

U.S. PATENT DOCUMENTS

| | | | | |
|---|---|---|---|---|
| 4,662,240 A | * | 5/1987 | Greenwood | 475/216 |
| 5,074,830 A | * | 12/1991 | Perry | 475/186 |
| 5,667,452 A | * | 9/1997 | Coutant | 475/72 |
| 5,876,299 A | * | 3/1999 | Kim et al. | 475/193 |
| 6,217,473 B1 | * | 4/2001 | Ueda et al. | 475/216 |

FOREIGN PATENT DOCUMENTS

JP 10-196759 7/1998

* cited by examiner

Primary Examiner—Sherry Estremsky
Assistant Examiner—Dennis Abdelnour
(74) Attorney, Agent, or Firm—Arent Fox Kintner Plotkin & Kahn, PLLC.

(57) ABSTRACT

An engine is connected to a sun gear of a planetary gear train via a toroidal type continuously variable transmission. Driven wheels of a vehicle are connected to a ring gear of the planetary gear train. The sun gear and the ring gear are connected to each other by a first clutch. A shifter can connect a second clutch connected to the engine either to a carrier of the planetary gear train or the driven wheels. When the vehicle is started when a failure of the electronic central system has occurred, by engaging the first and second clutches with predetermined engagement forces while the second clutch is connected to the carrier by the shifter, change of the ratio of the toroidal type continuously variable transmission beyond either the LOW ratio or the OD ratio is prevented so as to avoid generating an excessive load.

1 Claim, 16 Drawing Sheets

CONTINUOUSLY VARIABLE TRANSMISSION SYSTEM FOR VEHICLE

BACKGROUND OF THE INVENTION

1. Field of the Invention

The present invention relates to a continuously variable transmission system for a vehicle using a combination of a continuously variable transmission and a planetary gear train.

2. Description of the Related Art

Such a continuously variable transmission system for a vehicle is disclosed in Japanese Patent Application Laid-open No. 10-196759.

According to the known continuously variable transmission system, when the vehicle travels at a low speed, the engine torque is transmitted to the driven wheels only by a toroidal type continuously variable transmission. When the vehicle is traveling at a high speed, the engine torque is transmitted to the driven wheels by both the toroidal type continuously variable transmission and a planetary gear train, thereby achieving a wide range of ratios that cannot be achieved simply by using the toroidal type continuously variable transmission.

In order to control the ratio of the toroidal type continuously variable transmission, an electronic control device, such as a solenoid valve, is used. However, if the electronic control system fails, the ratio of the toroidal type continuously variable transmission cannot be controlled in some cases. If an electronic control device failure occurs when the vehicle is stationary, when the vehicle starts a load that changes the ratio of the toroidal type continuously variable transmission beyond the LOW ratio or a load that changes the ratio thereof beyond the OD ratio is generated, a large load is applied to either the input discs or output discs of the toroidal type continuously variable transmission, resulting in the possibility that the durability could be degraded. Furthermore, if the ratio of the transmission is fixed at the OD ratio, a torque transmitted to the driven wheels decreases, resulting in the possibility that the starting performance could substantially degrade or the vehicle speed could become excessive due to a high ratio when the vehicle reverses.

SUMMARY OF THE INVENTION

It is an object of this invention to overcome the above-described drawbacks.

More specifically, it is an object of this invention to prevent degradation of the starting performance and the durability of the continuously variable transmission of a continuously variable transmission system for a vehicle by controlling the ratio of the continuously variable transmission even when the electronic control system of the continuously variable transmission fails.

In order to achieve the above-mentioned object, in accordance with a characteristic of the present invention, the continuously variable transmission system of this invention includes a continuously variable transmission having an input member into which a torque of an engine is input and an output member to change the speed of rotation of the input member and to output the rotation. A planetary gear train has first, second, and third elements, wherein the first element is connected to the output member of the continuously variable transmission. The second element is connected to driven wheels. A first clutch engages the first element of the planetary gear train with the second element thereof. A second clutch having an input side connected to the engine and a shifter that connects the output side of the second clutch and the third element of the planetary gear train when the vehicle travels forward and connects the output side of the second clutch and the driven wheels when the vehicle travels in reverse.

In accordance with the above-mentioned arrangement, when the vehicle travels forward under normal conditions, that is, when there is no failure of the electronic control system, the output side of the second clutch is connected to the third element of the planetary gear train by the shifter and the first clutch is gradually engaged while the engagement of the second clutch is canceled. The torque of the engine is then transmitted to the drive wheels via the continuously variable transmission and the first clutch, thereby starting the vehicle. When the first clutch is completely engaged as the vehicle speed is increasing, the vehicle accelerates as the continuously variable transmission changes from a LOW ration to an OD ratio, that is a direct mode. When the ratio of the continuously variable transmission reaches the OD ratio, the second clutch is engaged and the engagement of the first clutch is canceled. The torque of the engine is input into the third element of the planetary gear train via the second clutch. A majority of the torque is then transmitted from the second element to the driven wheels to accelerate the vehicle. A proportion of the torque is then returned back to the engine side from the first element via the output member and the input member of the continuously variable transmission, that is, a torque slip mode. When the continuously variable transmission is shifted from the OD ratio to the LOW ratio in this state, the ratio of the entire continuously variable transmission system changes beyond the OD ratio of the continuously variable transmission to accelerate the vehicle.

When the vehicle travels in reverse under normal conditions, that is, when there is no failure of the electronic control system, the output side of the second clutch is connected to the driven wheels by the shifter and the clutch is gradually engaged. The torque of the engine is then transmitted to the driven wheels via the second clutch and the shifter, starting the vehicle. After the vehicle has started, the second clutch is completely engaged and the vehicle is accelerated by increasing the rotational rate of the engine.

When the vehicle travels forward at a time when the electronic control system of the continuously variable transmission has failed, the vehicle is started by connecting the output side of the second clutch to the third element of the planetary gear train by means of the shifter and gradually engaging the first clutch and the second clutch. In this case, the ratio of the continuously variable transmission is set at a predetermined ratio between the LOW ratio and the OD ratio so the engagement forces of the two clutches balance each other. When the first clutch is completely engaged, the ratio of the continuously variable transmission changes from the predetermined ratio toward the OD ratio. Subsequently, when the second clutch is completely engaged, the rotational rate of the engine is increased while the ratio of the continuously variable transmission is fixed at the OD ratio, and the vehicle thus accelerates. During this period, the torque of the engine is transmitted to the driven wheels via the second clutch, the shifter and the planetary gear train. Therefore, the continuously variable transmission only carries out the speed change and is not involved in the transmission of torque. By engaging the first and second clutches with predetermined engagement forces when the vehicle travels forward at a time when the electrical control system has failed, it is possible to prevent the ratio of the continuously variable transmission from changing beyond the LOW ratio or the OD ratio. Accordingly, generation of an excessive load can be prevented, thereby enhancing the durability of the continuously variable transmission.

When the vehicle travels in reverse when there is a failure of the electronic control system, the output side of the second clutch is connected to the driven wheels by the shifter and the second clutch is gradually engaged. The torque of the engine is thus transmitted to the driven wheels via the second clutch and the shifter, thus starting the vehicle. After the vehicle has started, the second clutch is completely engaged, and the rotational rate of the engine is increased so as to accelerate the vehicle. In this case, since the torque of the engine does not pass through the continuously variable transmission, it is possible to prevent degradation of the durability of the continuously variable transmission due to an excessive load.

In the cases of starting to travel in both the forward and reverse directions, since the ratio of the continuously variable transmission is not fixed at the OD ratio, the torque to be transmitted to the driven wheels does not decrease, which would greatly degrade the starting performance, and the vehicle speed does not become too high due to a high ratio after the vehicle has started to reverse.

The above-mentioned objects, other objects, characteristics and advantages of the present invention will become apparent from explanations of preferred embodiments that will be described in detail below by reference to the attached drawings.

BRIEF DESCRIPTION OF THE DRAWINGS

FIGS. 14 to 15B illustrate a second embodiment of the present invention;

FIG. 14 is a schematic diagram of a continuously variable transmission system.

FIGS. 15A and 15B are graphs regarding the speed of a planetary gear train; and

DESCRIPTION OF PREFERRED EMBODIMENTS

Figure 1:
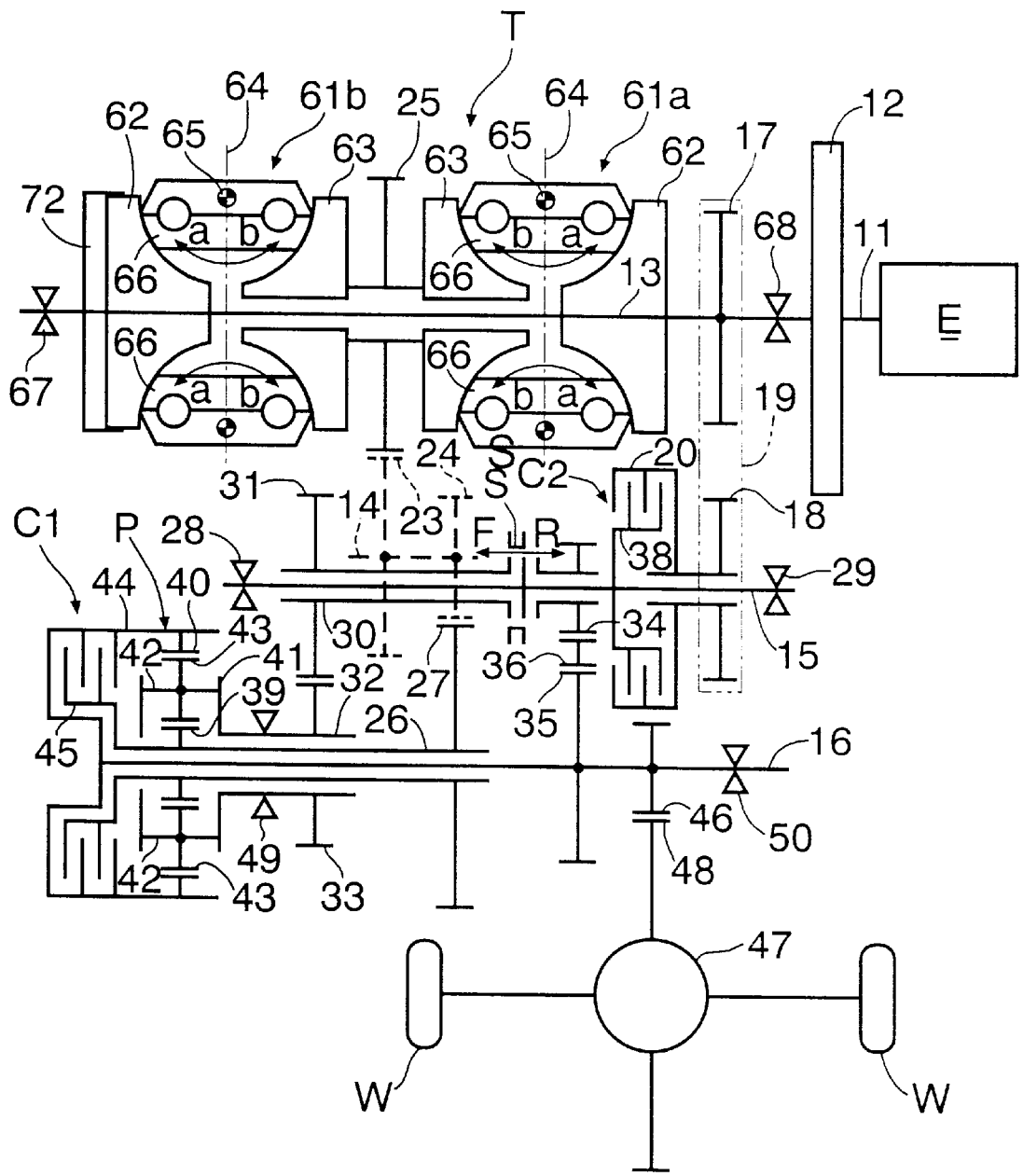
FIG. 1 is a skeleton diagram of a continuously variable transmission system according to a first embodiment of this invention.
Figure 2:
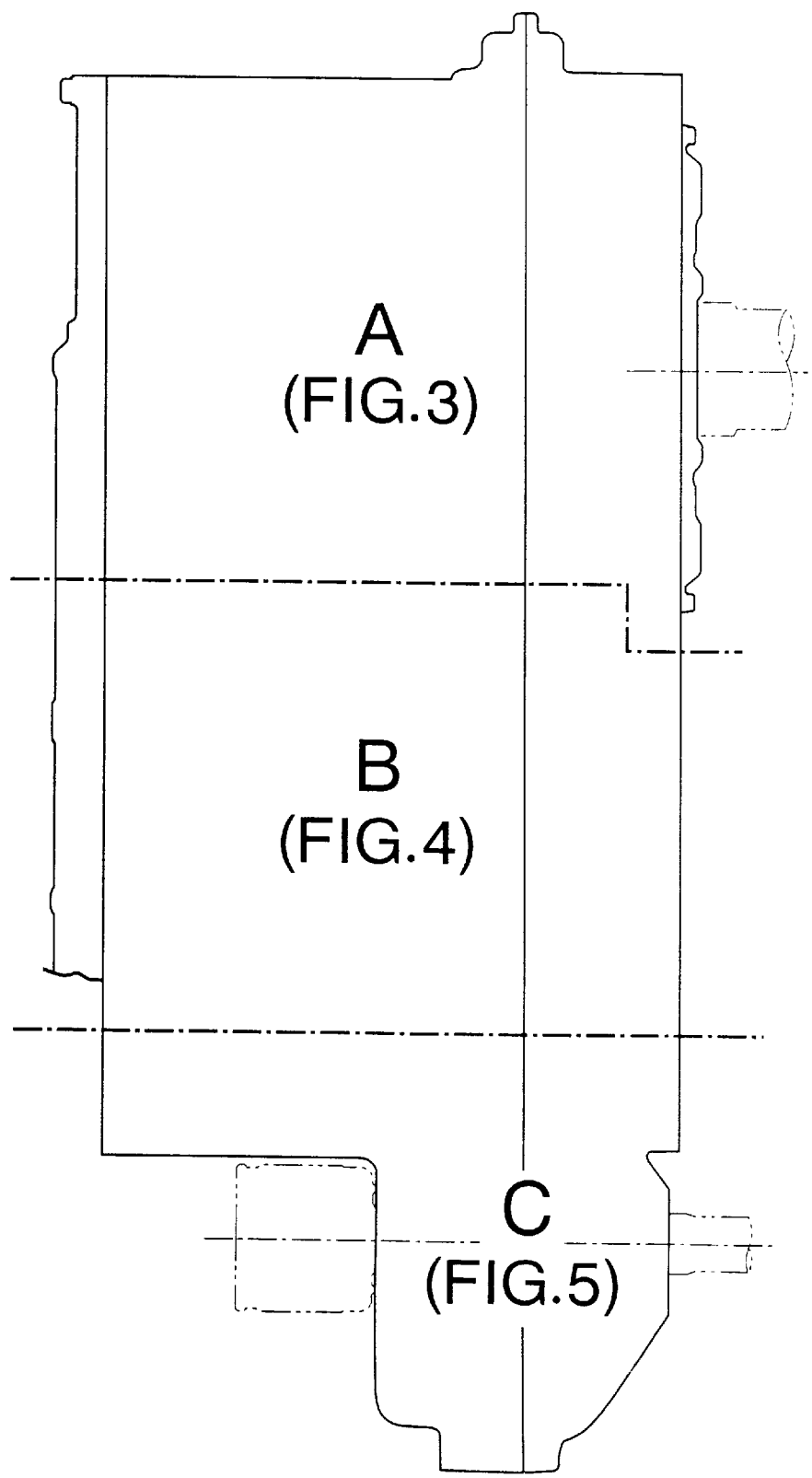
FIG. 2 is a map showing the layout of FIGS. 3 to 5.

The first embodiment of this invention is explained below with reference to FIGS. 1 to 13B.

As shown in FIG. 1 and FIGS. 3 to 5, a continuously variable transmission system for an automobile comprises a toroidal type continuously variable transmission T, a single pinion type planetary gear train P, a forward drive clutch C1, hereinafter called a first clutch C1, formed from a wet type multiplate clutch, and a reverse start and torque split clutch C2, hereinafter called a second clutch C2, formed from a wet type multiplate clutch. A crankshaft 11 of an engine E is connected to an input shaft 13 of the toroidal type continuously variable transmission T via a damper 12. A first shaft 14, a second shaft 15 and a third shaft 16 are placed parallel to the input shaft 13 of the toroidal type continuously variable transmission T. The first clutch C1 is provided on the left end of the third shaft 16, and the second clutch C2 is provided on the right end of the second shaft 15. A drive sprocket 17 fixed to the input shaft 13 of the toroidal type continuously variable transmission T and a driven sprocket 18 supported on the right end of the second shaft 15 in a relatively rotatable manner are connected to each other via an endless chain 19. The driven sprocket 18 on the second shaft 15 and a clutch outer 20 of the second clutch C2 integral with the driven sprocket 18 always rotate during operation of the engine E.

Figure 3:
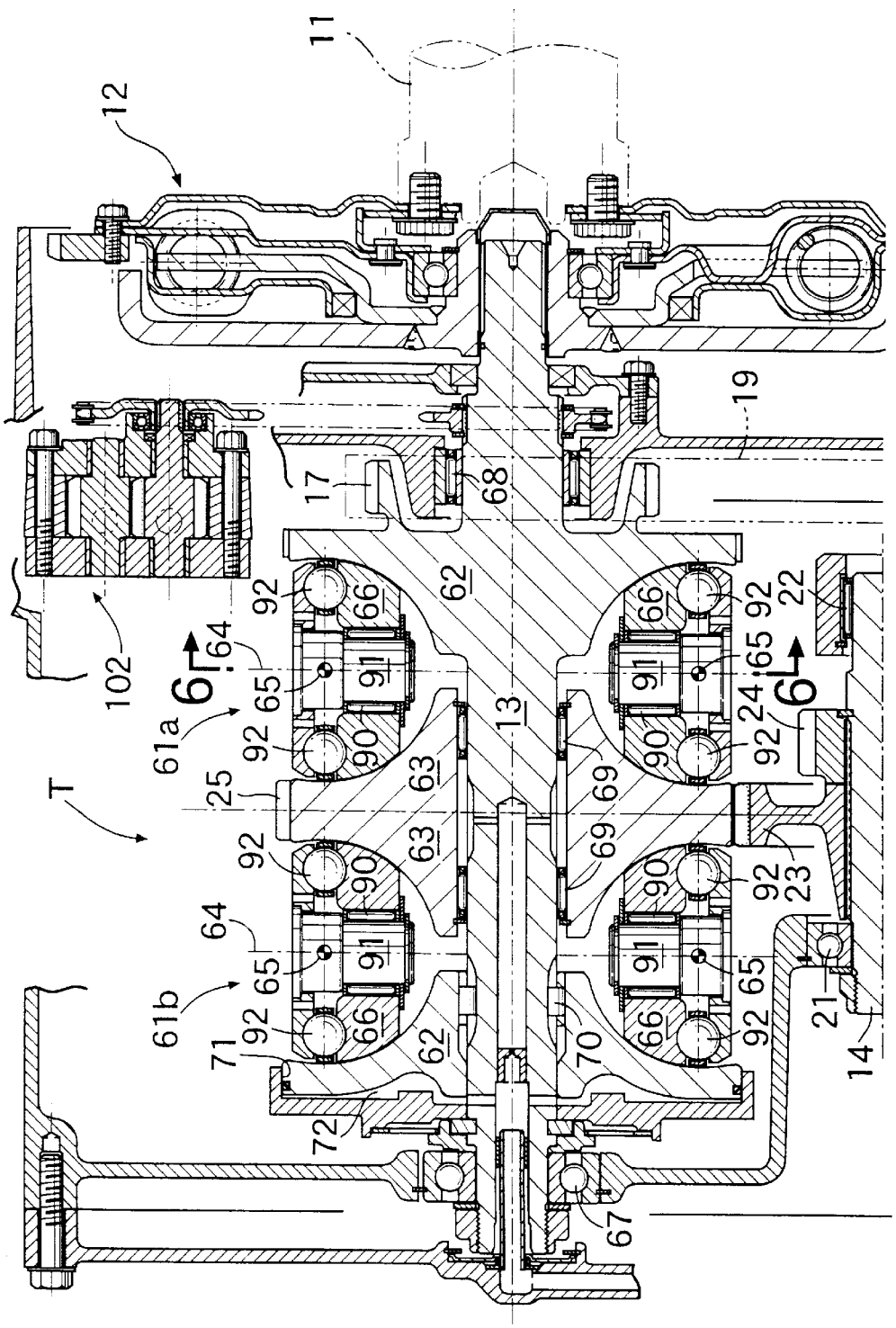
FIG. 3 is a magnified view of part A in FIG. 2.
Figure 4:
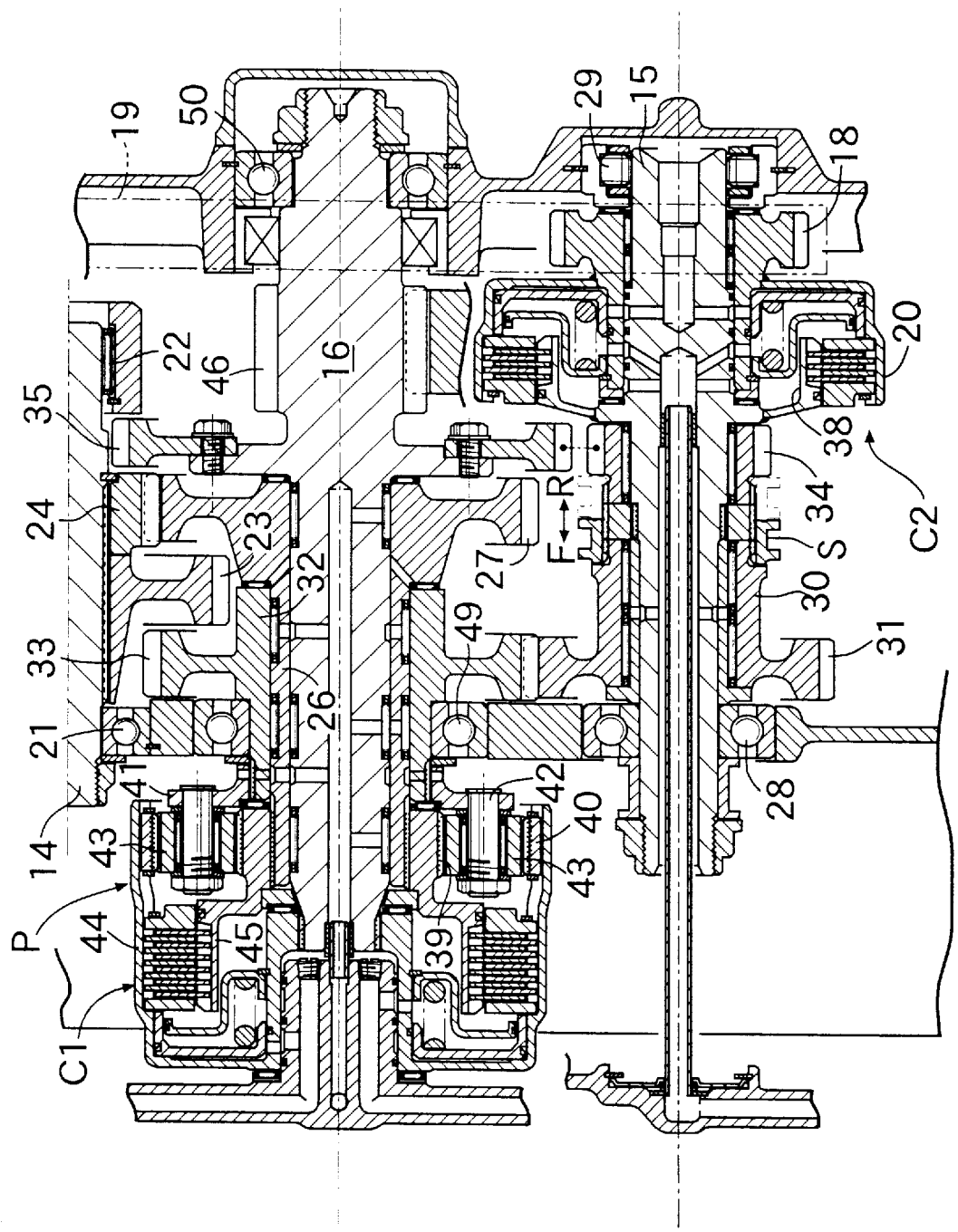
FIG. 4 is a magnified view of part B in FIG. 2.
Figure 5:
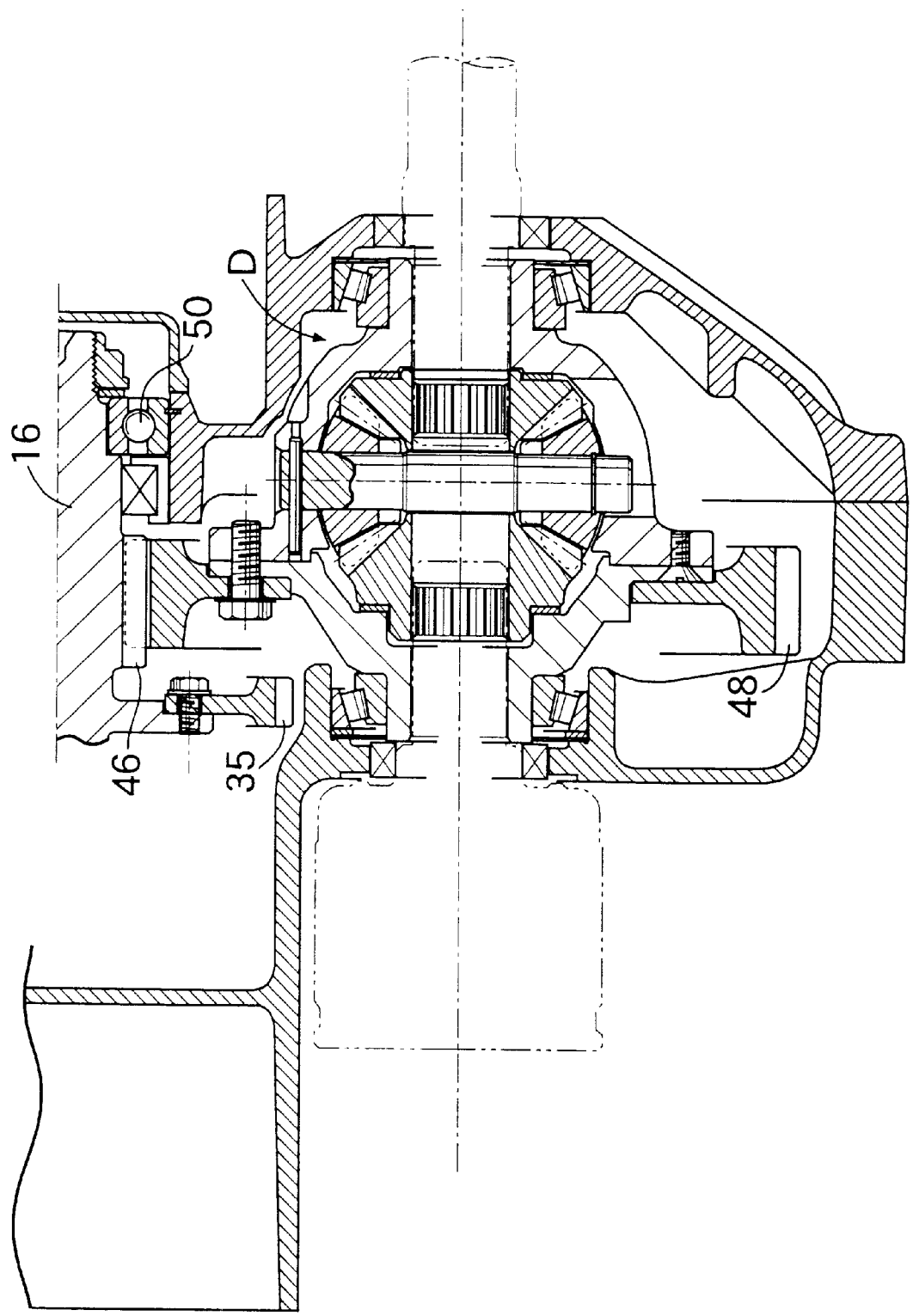
FIG. 5 is a magnified view of part C in FIG. 2.

A first helical gear 23 and a second helical gear 24 are fixed to the first shaft 14 that is supported in a casing by a pair of bearings 21 and 22 (FIGS. 3–4). The first helical gear 23 meshes with an output gear 25 of the toroidal type continuously variable transmission T, and the second helical gear 24 meshes with a third helical gear 27 fixed to a sleeve 26 fitted around the third shaft 16 in a relatively rotatable manner. A fourth helical gear 31 is fixed to a sleeve 30 fitted in a relatively rotatable manner around the second shaft 15 supported in the casing by a pair of bearings 28 and 29. The fourth helical gear 31 meshes with a fifth helical gear 33 fixed to a sleeve 32 fitted around the outer periphery of the sleeve 26 of the third shaft 16 in a relatively rotatable manner. A sixth helical gear 34 is supported on the second shaft 15 in a relatively rotatable manner and meshes, via an eighth helical gear 36, with a seventh helical gear 35 that is fixed to the third shaft 16. The eighth helical gear 36 is a reverse idle gear and is not illustrated in FIG. 4. The sleeve 30, that is, the fourth helical gear 31, and the sixth helical gear 34 can be linked selectively to the second shaft 15 by a shifter S. A clutch inner 38 of the second clutch C2 is fixed to the second shaft 15, and when the second clutch C2 is engaged, the driven sprocket 18 is therefore linked to the second shaft 15.

The planetary gear train P that is provided on the third shaft 16 comprises a sun gear 39 fixed to the sleeve 26, a ring gear 40 and a plurality of pinions 43 that are rotatably supported via a plurality of pinion shafts 42 on a carrier 41 fixed to the sleeve 32 and mesh with the sun gear 39 and the ring gear 40. The first clutch C1 comprises a clutch outer 44 that is integral with the ring gear 40 of the planetary gear train P and the third shaft 16, and a clutch inner 45 that is integral with the sun gear 39 and the sleeve 26. Therefore, when the first clutch C1 is engaged, the planetary gear train P is locked, and the third shaft 16 joined to the ring gear 40, the sleeve 26 joined to the sun gear 39 and the sleeve 32 joined to the carrier 41, are all unified. A final drive gear 46 fixed to the right end of the third shaft 16 meshes with a final driven gear 48 provided on a differential gear 47. The third shaft 16 is supported in the casing via a bearing 49 provided on the outer periphery of the sleeve 32 and a bearing 50 provided on the outer periphery of the third shaft 16.

The structure of the toroidal type continuously variable transmission T will now be explained.

The input shaft 13 of the toroidal type continuously variable transmission T is connected to the engine E via the damper 12 of the crankshaft 11, and supports a first continuously variable transmission mechanism 61a and a second continuously variable transmission mechanism 61b that have a substantially identical structure. The first continuously variable transmission mechanism 61a comprises an approximately cone-shaped input disc 62 that is fixed to the input shaft 13, an approximately cone-shaped output disc 63 supported on the input shaft 13 in a relatively rotatable manner, and a pair of power rollers 66. The power rollers 66 are rotatably supported around a roller axis 64 and tiltably supported around trunnion axes 65 so as to be in contact with the above-mentioned input disc 62 and output disc 63. Surfaces of the input disc 62 and the output disc 63 opposite each other have a toroidal curvature. When the power rollers 66 tilt around the trunnion axes 65, the points of the power rollers 66 that are in contact with the input disc 62 and the output disc 63 change.

The second continuously variable transmission mechanism 61b is positioned substantially symmetrical to the first continuously variable transmission mechanism 61a relative to the plane of the output gear 25.

When the power rollers 66 tilt in the direction of the arrows a, since the points of contact with the input discs 62 move radially outward relative to the input shaft 13 and the points of contact with the output discs 63 move radially inward relative to the input shaft 13, the rotation of the input discs 62 is transmitted to the output discs 63 in an increased manner, and the ratio of the toroidal type continuously variable transmission T changes continuously toward the OD side. On the other hand, when the power rollers 66 tilt in the direction of the arrows b, since the points of contact with the input discs 62 move radially inward relative to the input shaft 13 and the points of contact with the output discs 63 move radially outward relative to the input shaft 13, the rotation of the input discs 62 is transmitted to the output discs 63 in a decreased manner, and the ratio of the toroidal type continuously variable transmission T changes continuously toward the LOW side.

Figure 6:
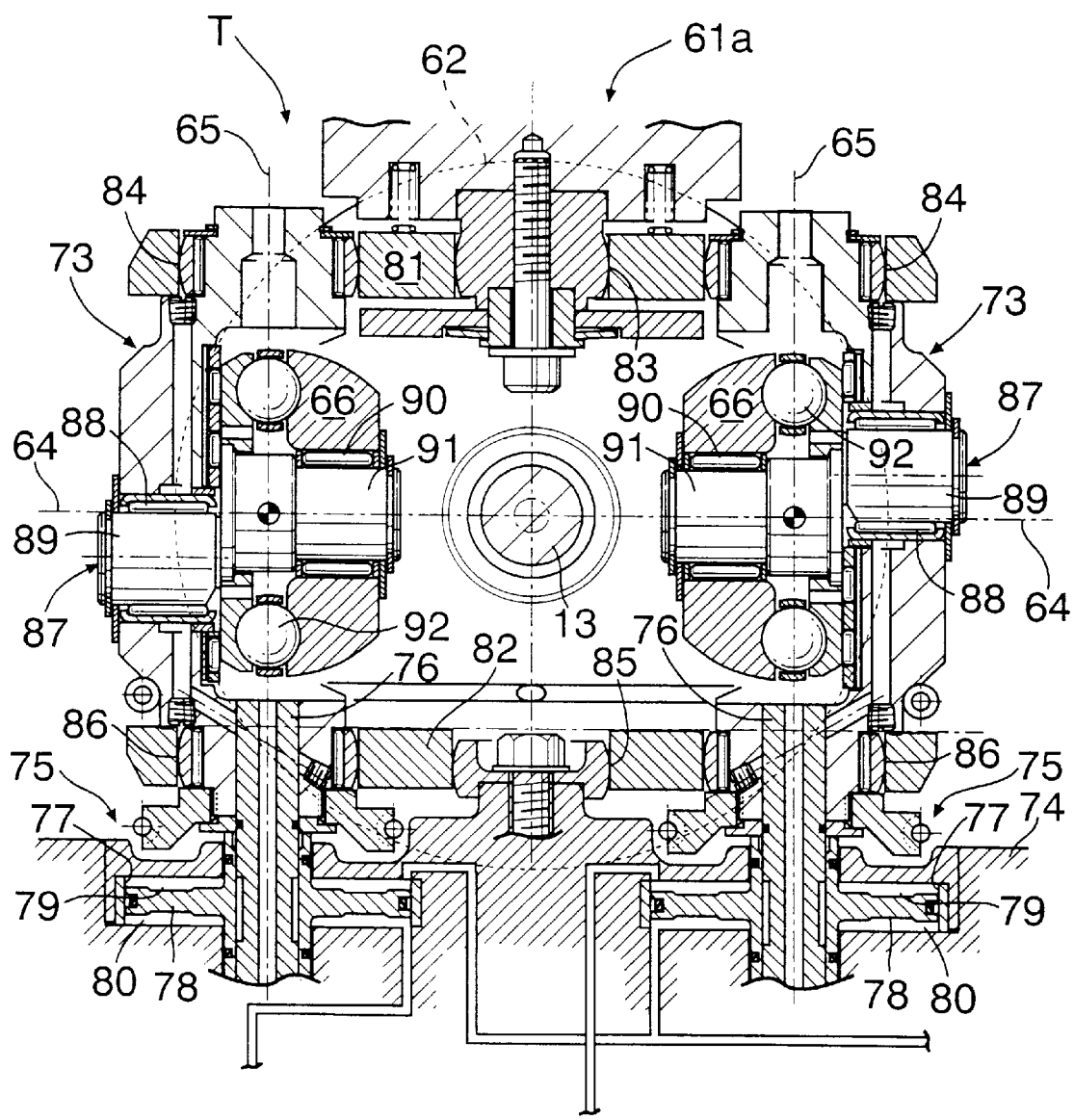
FIG. 6 is a cross-sectional view of section line 6—6 in FIG. 3.
Figure 7:
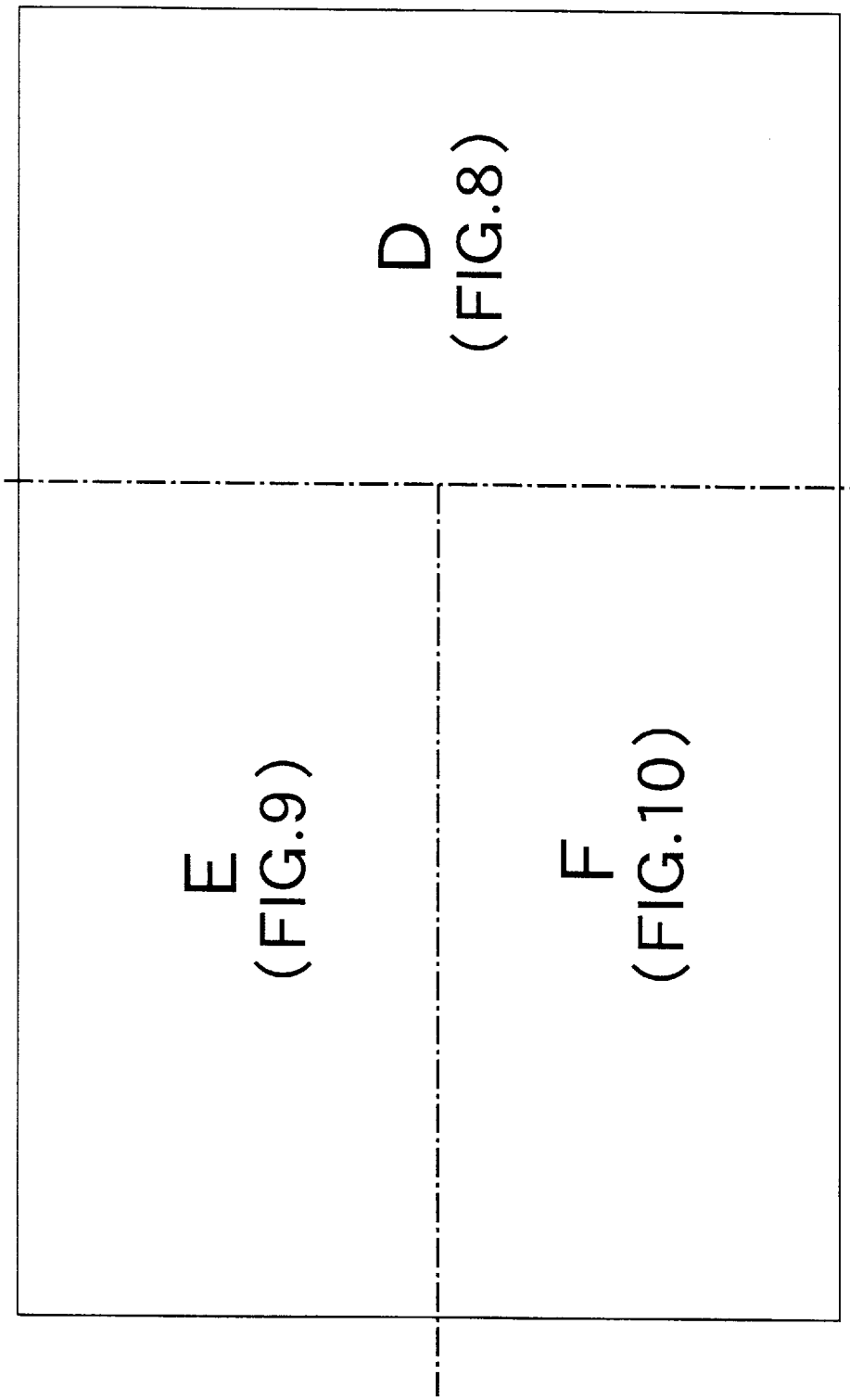
FIG. 7 is a map showing the layout of FIGS. 8 to 10.

The structure of the toroidal type continuously variable transmission T is further explained below by reference to FIGS. 3 and 6.

The input disc 62 of the first continuously variable transmission mechanism 61a is integrally formed with the input shaft 13 supported in the casing by a pair of bearings 67 and 68. The output discs 63 of the first and second continuously variable transmission mechanisms 61a and 61b are integrally formed with each other and are supported on the input shaft 13 via bearings 69 in a relatively rotatable and axially slidable manner. The input disc 62 of the second continuously variable transmission mechanism 61b is supported on the input shaft 13 via a roller spline 70 in a relatively non-rotatable and axially slidable manner. A cylinder 71 is coaxially provided on the left end of the input shaft 13. An oil chamber 72 is formed between the cylinder 71 and the input disc 62 of the second continuously variable transmission mechanism 61b, the input disc 62 being slidably fitted inside the cylinder 72. When a hydraulic pressure is applied to the oil chamber 72, the input disc 62 of the second continuously variable transmission mechanism 61b and the output discs 63 of the first and second continuously variable transmission mechanisms 61a and 61b are therefore pressed toward the input disc 62 of the first continuously variable transmission mechanism 61a, thereby enabling generation of a load that suppresses slip between the power rollers 66 and the input discs 62 and output discs 63.

Right and left trunnions 73 that support the pair of power rollers 66 are positioned so the input shaft 13 is interposed between the right and left trunnions 73. Piston rods 76 of right and left hydraulic actuators 75 provided in a hydraulic control block 74 are connected to the corresponding lower ends of the above-mentioned trunnions 73. The hydraulic actuators 75 include cylinders 77 formed in the hydraulic control block 74, pistons 78 slidably fitted in the cylinders 77 and connected to the above-mentioned piston rods 76, upper oil chambers 79 formed above the pistons 78, and lower oil chambers 80 formed below the pistons 78.

The piston rods 76 are provided coaxially with the trunnion axes 65. The trunnions 73 can therefore tilt around the trunnion axes 65 with the piston rods 76 functioning as support shafts. When a hydraulic pressure is applied to the lower oil chamber 80 of the left-hand hydraulic actuator 75, a hydraulic pressure is also applied to the upper oil chamber 79 of the right-hand hydraulic actuator 75. As a result, the right and left piston rods 76 are driven in directions opposite to each other, and when one of the right and left trunnions 73 ascends along the trunnion axis 65, the other trunnion descends along the trunnion axis 65.

In order to reliably synchronize the vertical movement of the right and left trunnions 73, the right and left trunnions 73 are connected at their upper ends by an upper yoke 81 and at their lower ends by a lower yoke 82. That is to say, a middle section of the upper yoke 81 is pivotally supported on the hydraulic control block 74 in a tiltable manner via a ball joint 83. Also, the right and left ends of the upper yoke 81 are pivotally supported on upper ends of the right and left trunnions 73 in a tiltable and rotatable manner via ball joints 84. In addition, a middle section of the lower yoke 82 is pivotally supported on the hydraulic control block 74 in a tiltable manner via a ball joint 85, and the right and left ends of the lower yoke 82 are pivotally supported on lower ends of the right and left trunnions 73 in a tiltable and rotatable manner via ball joints 86.

Pivot shafts 87 that support the power rollers 66 on the trunnions 73 include trunnion supports 89 rotatably supported in the trunnions 73 via bearings 88 and power roller supports 91 that rotatably support the power rollers 66 via bearings 90. With regard to one of the pivot shafts 87, the trunnion support 89 is eccentric downward relative to the power roller support 91. With regard to the other one of the pivot shafts 87, the trunnion support 89 is eccentric upward relative to the power roller support 91. Bearings 92 are placed between the power rollers 66 and the trunnions 73 so as to allow smooth movement of the power rollers 66 relative to the trunnions 73. When the right and left trunnions 73 move in directions opposite each other, the power rollers 66 tilt in the directions shown by arrows a and b in FIG. 1 around the trunnion axes 65 together with the trunnions 73 due to the reaction forces arising from the input disc 62 and the output disc 63. Also, the ratios of the first and second continuously variable transmission mechanisms 61a and 61b continuously change in synchronism with each other.

Figure 8:
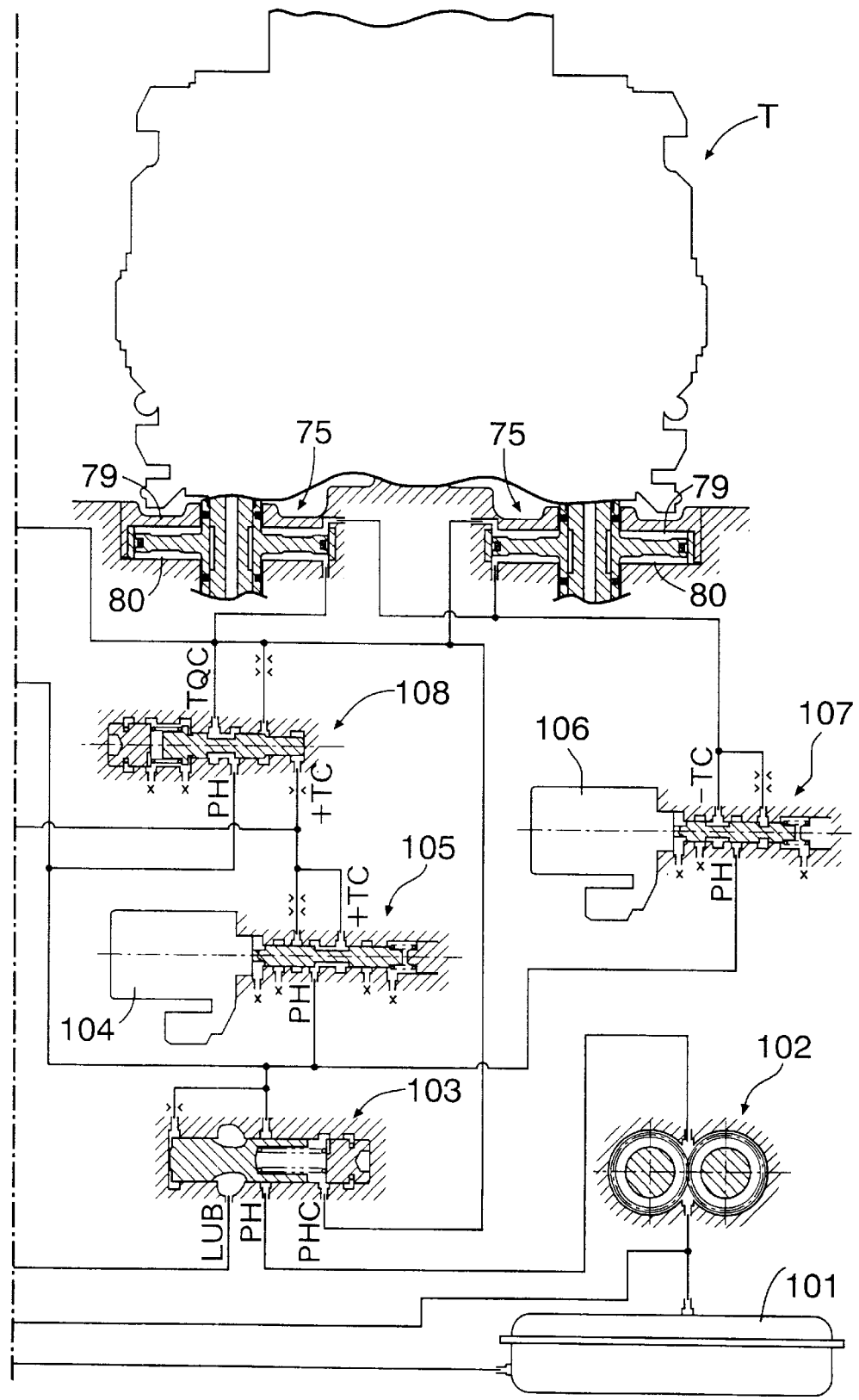
FIG. 8 is a magnified view of part D in FIG. 7.
Figure 9:
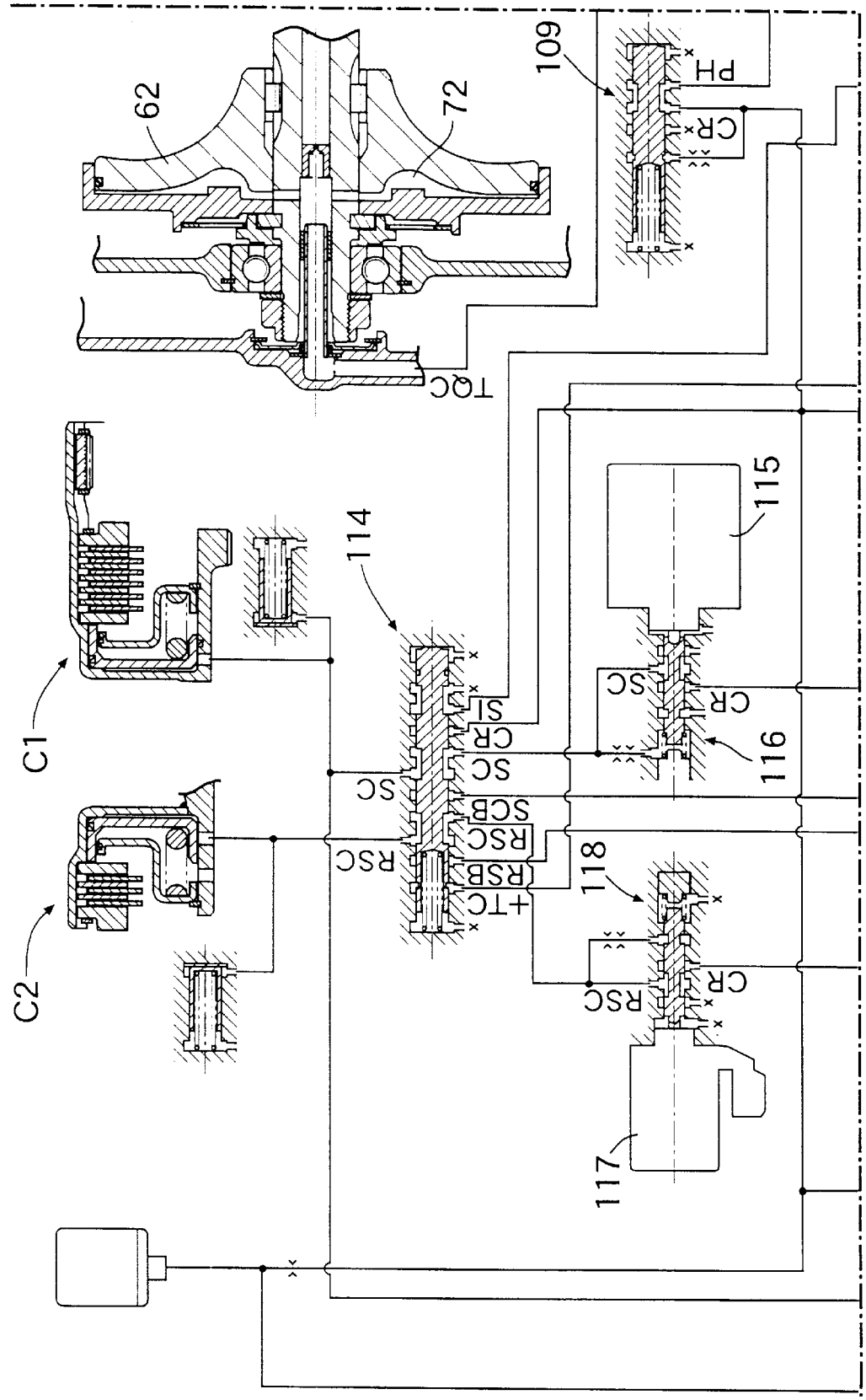
FIG. 9 is a magnified view of part E in FIG. 7.
Figure 10:
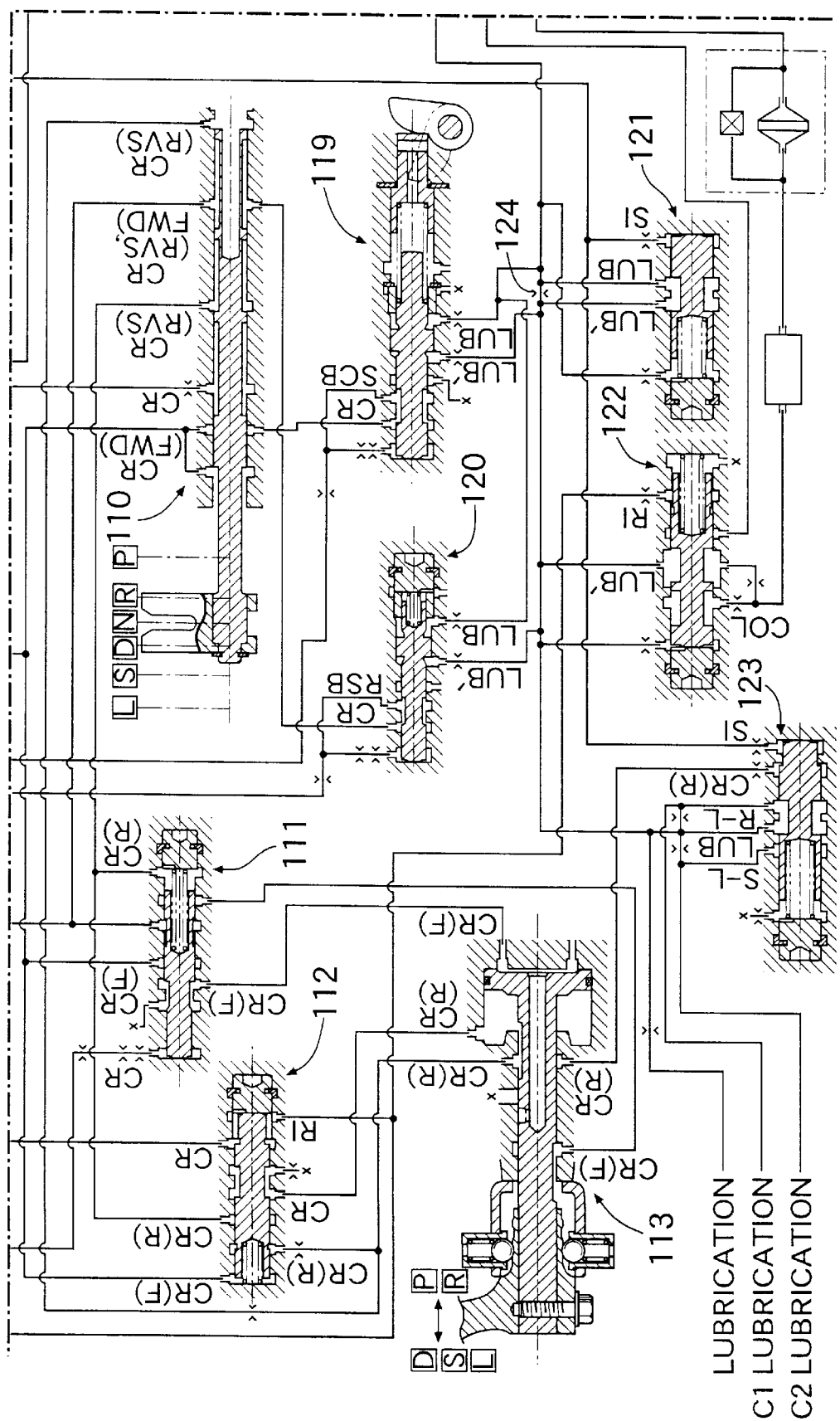
FIG. 10 is a magnified view of part F in FIG. 7.
Figure 11A:
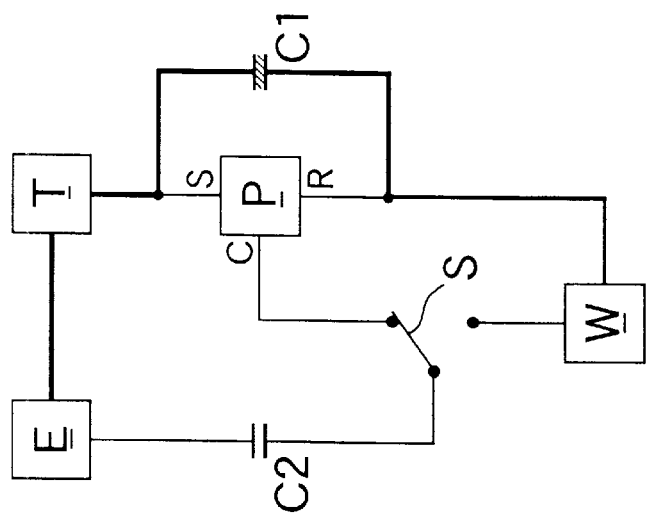
FIGS. 11A to 11C are schematic diagrams that explain a power transmission route when the continuously variable transmission system operates under normal conditions.
Figure 11B:
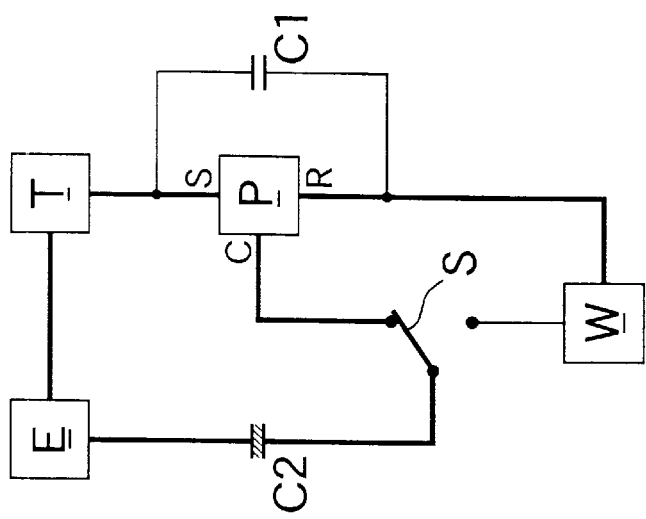
Figure 11C:
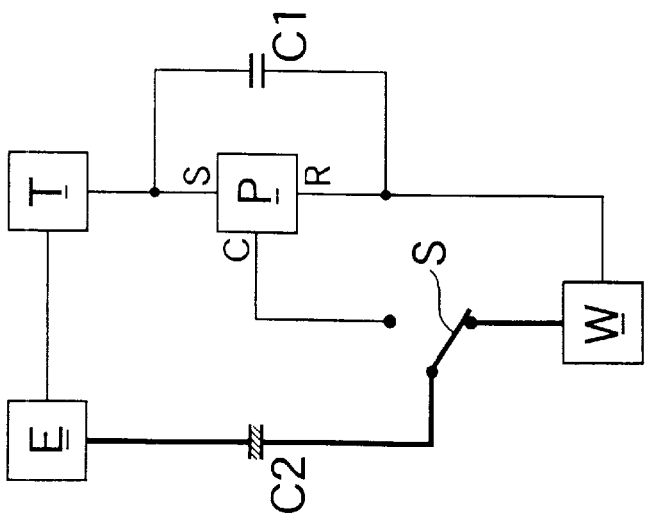
Figure 12A:
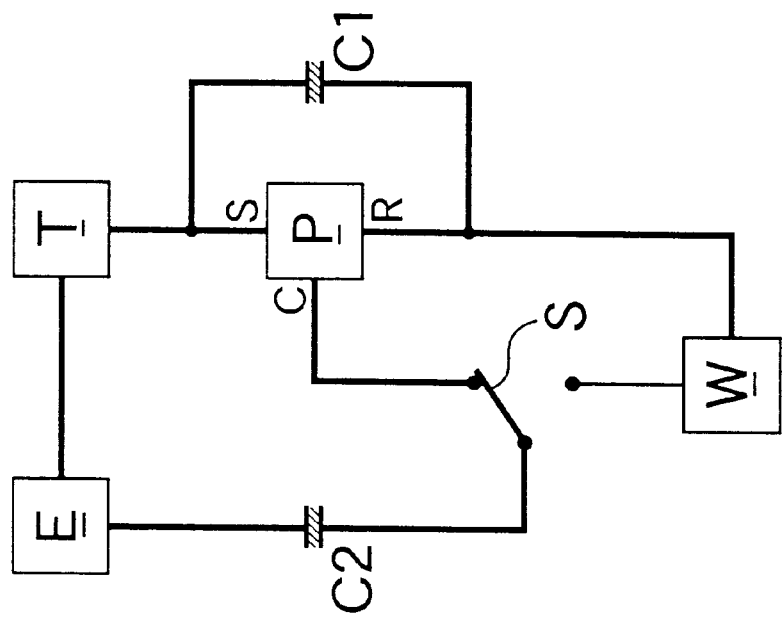
FIGS. 12A and 12B are schematic diagrams that explain a power transmission route when the continuously variable transmission system fails.
Figure 12B:
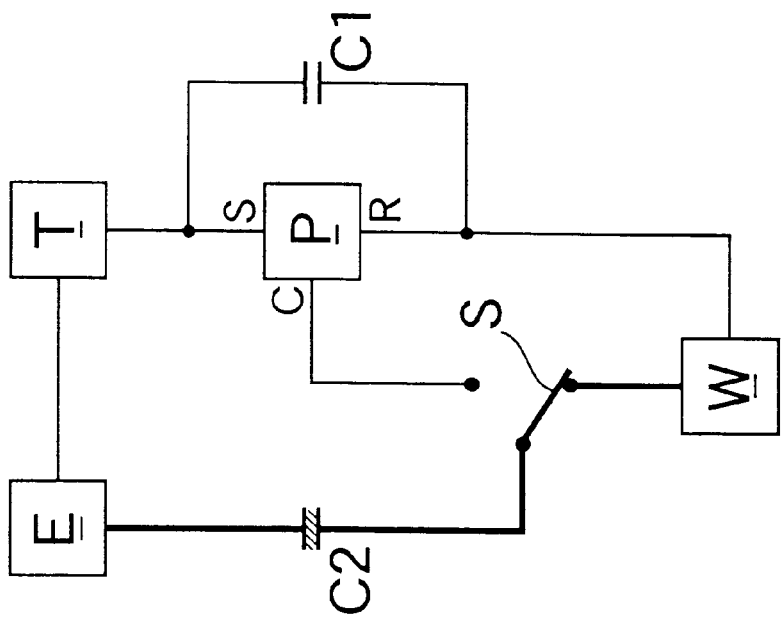

The arrangement of the hydraulic control circuit for controlling the continuously variable transmission system is now explained with reference to FIGS. 8 to 10.

The hydraulic control circuit comprises an oil tank 101, an oil pump 102, a PH regulator valve 103, a +TC valve 105 operated by an electronic control solenoid 104, a −TC valve 107 operated by an electronic control solenoid 106, a TQ control valve 108, a CLCH reducing valve 109, a manual valve 110, a D-INH valve 111, an RVS CPC valve 112, a servo valve 113, a shift inhibitor valve 114, an SC control valve 116 operated by an electronic control solenoid 115, an RVS SCC valve 118 operated by an electronic control solenoid 117, an SC back up valve 119, an RSC back up valve 120, an SC shift valve 121, a lubrication valve 122, and an SC-LUB shift valve 123.

The actions of the continuously variable transmission system having the above-mentioned arrangement are explained for each of the cases where the vehicle travels forward under normal conditions, that is no failure has occurred, where the vehicle travels in reverse under normal conditions, that is no failure has occurred, where the vehicle travels forward when a failure has occurred, and where the vehicle travels in reverse when a failure has occurred.

(1) Vehicle Travels Forward Under Normal Conditions

Control of the speed change of the toroidal type continuously variable transmission T is explained first. A pressure PH obtained by adjusting the pressure discharged from the oil pump 102 by the PH regulator valve 103 is converted by the +TC valve 105 operated by the electronic control solenoid 104 and the TQ control valve 108 into a pressure TQC, and is converted by the −TC valve 107 that is operated by the electronic control solenoid 106 into a pressure −TC. The high pressure TQC works on the lower oil chamber 80 of the left-hand hydraulic actuator 75 of the toroidal type continuously variable transmission T and the upper oil chamber 79 of the right-hand hydraulic actuator 75 thereof, while the pressure −TC works on the upper oil chamber 79 of the left-hand hydraulic actuator 75 of the toroidal type continuously variable transmission T and the lower oil chamber 80 of the right-hand hydraulic actuator 75 thereof. The pressure TQC also works on the oil chamber 72 of the toroidal type continuously variable transmission T (see FIG. 3), producing a thrust in the axial direction, thereby preventing slip of the power rollers 66.

When a torque of the engine E is applied to the toroidal type continuously variable transmission T, loads that drag the power rollers 66 in the direction of rotation of the input discs 62 are generated, attempting to tilt the power rollers 66 in a direction in which the ratio decreases. However, the difference between the pressure TQC and the pressure −TC drives the pistons 78 of the hydraulic actuators 75 generating loads in the opposite direction so as to counteract the above-mentioned loads. If the loads generated by the hydraulic actuators 75 are larger than the loads generated by the torque of the engine E, the ratio of the toroidal type continuously variable transmission T changes toward the OD side. If the loads generated by the torque of the engine E are larger than the loads generated by the hydraulic actuators 75, the ratio of the toroidal type continuously variable transmission T changes toward the LOW side. By controlling the duty ratio of the pair of electronic control solenoids 104 and 106, the ratio of the toroidal type continuously variable transmission T can thus be made to vary between a LOW ratio, that is 2.415 in the present embodiment, and an OD ratio 0.415 in the present embodiment.

When a selector is positioned in a D range so as to move the vehicle in the forward direction, since the spool of the manual valve 110 moves leftward, a pressure CR obtained by reducing the pressure PH via the CLCH reducing valve 109 is transmitted from a CR port of the manual valve 110 via a CR(FWD) port to both a CR(F) port of the D-INH valve 111 and a CR(F) port of the RVS CPC valve 112. As a result, since the spool of the RVS CPC valve 112 is maintained at a rightward position (FIG. 10), a CR port connected to the CLCH reducing valve 109 is therefore cut off, and a CR(R) port of the servo valve 113 is open to the air. On the other hand, since a first clutch pressure SC for engaging the first clutch C1 is transmitted to a CR port of the D-INH valve 111 via the route described below, the spool of the D-INH valve 111 moves rightward. As a result, the CR(F) port of the D-INH valve 111 communicates with a CR(F) port of the servo valve 113, the spool moves leftward, and the shifter S is switched over to the forward side (the direction of arrow F in FIG. 1).

Since the spool of the shift inhibitor valve 114 is normally at a rightward position (FIG. 9), the pressure CR discharged from the CR(FWD) port of the manual valve 110 can be adjusted to the pressure SC by the SC control valve 116, which is operated by the electronic control solenoid 115, engaging the first clutch C1. Since the pressure CR discharged from a CR(F) port of the servo valve 113 is also transmitted to the CR port of the RVS SCC valve 118, the pressure CR is adjusted to a pressure RSC by the RVS SCC valve 118 operated by the electronic control solenoid 117, whereby the second clutch C2 is engaged. As described above, the pressure SC is transmitted to the CR port of the D-INH valve 111, thereby moving its spool rightward.

Figure 13A:
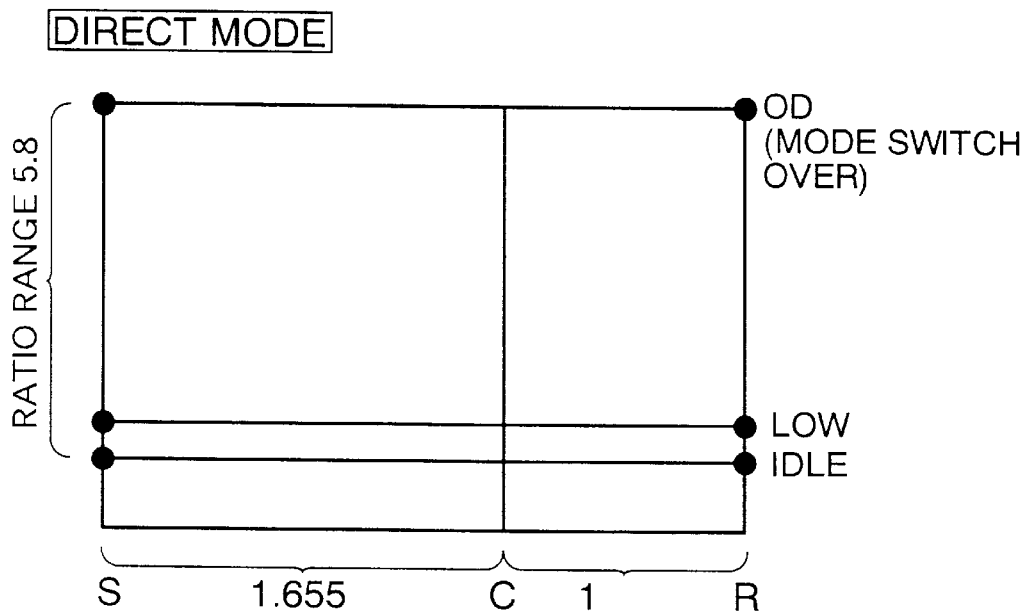
FIGS. 13A and 13B are graphs regarding the speed of a planetary gear train.

When the vehicle travels in the forward direction under normal operating conditions, the vehicle is started with the toroidal type continuously variable transmission T at the LOW ratio and is accelerated until the ratio reaches the OD ratio. This travel mode is called the direct mode. The power transmission route in this case is shown by the bold line in FIG. 11A, and a graph of the speed of the planetary gear train P is shown in FIG. 13A. In the direct mode, the first clutch C1 alone is engaged while maintaining the second clutch C2 in a non-engaged state. That is to say, in FIGS. 1 and 4, when the first clutch C1 is engaged, the ring gear 40 and the sun gear 39 are unified to lock the planetary gear train P, and the torque of the engine E is transmitted to the driven wheels W via the toroidal type continuously variable transmission T and the first clutch C1. More particularly, the torque of the engine E is transmitted to the driven wheels W via a route including the crankshaft 11, the damper 12, the input shaft 13 of the toroidal type continuously variable transmission T, the output gear 25 of the toroidal type continuously variable transmission T, the first helical gear 23, the second helical gear 24, the third helical gear 27, the sleeve 26, the first clutch C1, the third shaft 16, the final drive gear 46, the final driven gear 48, and the differential gear 47 in the above-detailed order,thereby driving the vehicle forward.

During this period, although rotation of the carrier 41 of the planetary gear train P is transmitted to the clutch inner 38 of the second clutch C2 via the sleeve 32, the fifth helical gear 33, the fourth helical gear 31, the sleeve 30, the shifter S and the second shaft 15 in the above-detailed order. Since the second clutch C2 is in a non-engaged state, the clutch inner 38 of the second clutch C2 does not impede the clutch outer 20 thereof which is connected to the input shaft 13 via the driven sprocket 18, the endless chain 19 and the drive sprocket 17.

After the first clutch C1 has been completely engaged, by controlling the duty ratio of the pair of electronic control solenoids 104 and 106 based on the rotational rate of the engine, the vehicle speed, the degree of opening of the accelerator, and the like, the vehicle is accelerated as the ratio of the toroidal type continuously variable transmission T is changed from LOW to OD. The ratio range during this period is 5.8, which is the ratio of the LOW ratio (2.415) to the OD ratio (0.415) of the toroidal type continuously variable transmission T.

Figure 13B:
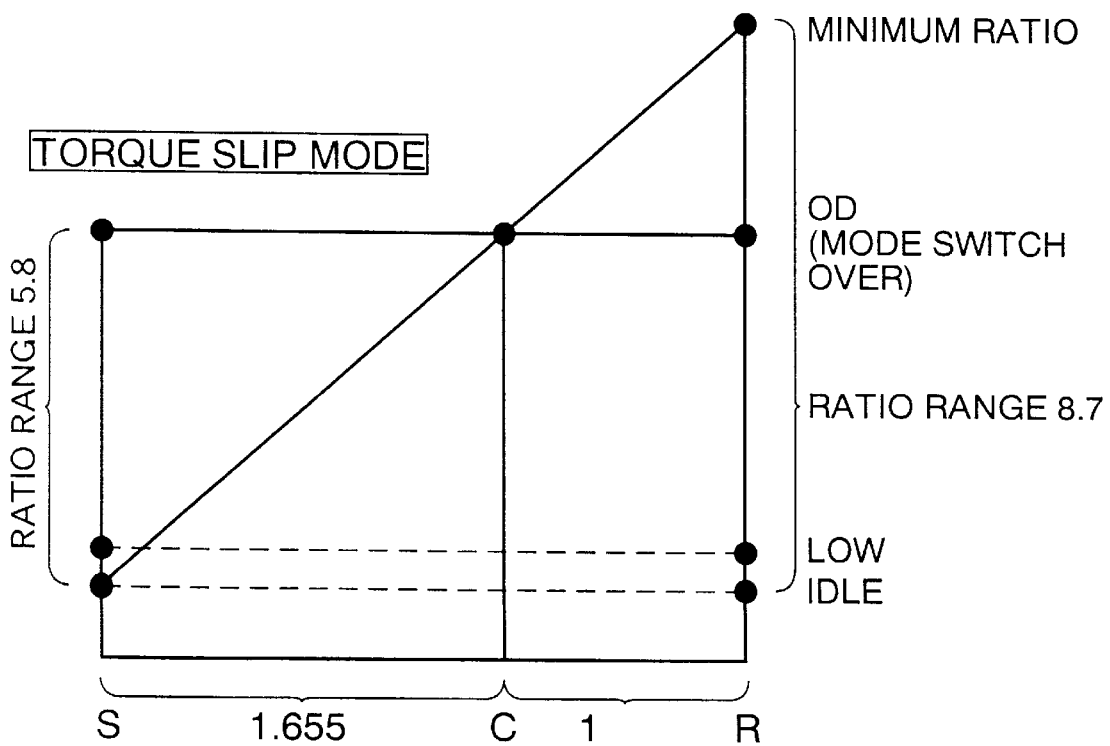

When the toroidal type continuously variable transmission T reaches the OD ratio, the duty ratio of the electronic control valve 115 of the SC control valve 116 to the electronic control valve 117 of the RVS SCC valve 118 is controlled so as to disengage the first clutch C1 and engage the second clutch C2, which has been in the non-engaged state. Furthermore, by controlling the duty ratio of the electronic control solenoids 104 and 106, the ratio of the toroidal type continuously variable transmission T is changed from OD to LOW. Accordingly, the ratio of the entire continuously variable transmission system can be increased beyond the OD ratio which is the maximum ratio for the toroidal type continuously variable transmission T alone, and the ratio range in the direct mode can be increased from 5.8 to 8.7. This travel mode is called a torque split mode. The power transmission route in this case is shown by the bold line in FIG. 11B, and a graph of the speed of the planetary gear train P is shown in FIG. 13B.

In the torque split mode, the torque of the engine E is transmitted to the carrier 41 of the planetary gear train P via a route including the crankshaft 11, the damper 12, the input shaft 13 of the toroidal type continuously variable transmission T, the drive sprocket 17, the endless chain 19, the driven sprocket 18, the clutch outer 20 of the second clutch C2, the clutch inner 38 of the second clutch C2, the second shaft 15, the shifter S, the sleeve 30, the fourth helical gear 31, the fifth helical gear 33, and the sleeve 32 in the above-detailed order. A majority of the torque that has been transmitted to the carrier 41 of the planetary gear train P is transmitted to the driven wheels W by a route including the ring gear 40, the clutch outer 44 of the first clutch C1, the third shaft 16, the final drive gear 46, the final driven gear 48, and the differential gear 47 in the above-detailed order, thereby driving the vehicle in the forward direction. A proportion of the torque that has been transmitted to the carrier 41 of the planetary gear train P is transmitted back to the input shaft 13 of the toroidal type continuously variable transmission T via a route including the sun gear 39 of the planetary gear train P, the sleeve 26, the third helical gear 27, the second helical gear 24, the first helical gear 23, and the output gear 25 in the above-detailed order, and from there to the driven wheels W via the above-mentioned route including the second clutch C2.

When the toroidal type continuously variable transmission T is shifted from the OD ratio side to the LOW ratio side in the torque split mode, the ratio of the entire continuously variable transmission system increases further. This is because when the toroidal type continuously variable transmission T is in the LOW ratio and the rotation of the output gear 25 decreases, the rotation of the sun gear 39 of the planetary gear train P connected to the output gear 25 decreases, and the rotation of the ring gear 40 of the planetary gear train P connected to the driven wheels W increases accordingly.

When the vehicle starts to travel in the forward direction, the load on the first clutch C1 that functions as a starting clutch increases. In order to cool the first clutch C1 by supplying the clutch with a sufficient amount of oil, oil discharged from a LUB port of the PH regulator valve 103 is supplied to a section of the first clutch C1 to be lubricated via a LUB port and a LUB' port of the SC shift valve 121 and further a LUB port and R-L port of the SC-LUB shift valve 123.

(2) Vehicle Travels in Reverse Under Normal Conditions

When the selector is positioned in an R range to drive the vehicle in the reverse direction, since the spool of the manual valve 110 moves rightward, the pressure CR obtained by reducing the pressure PH by means of the CLCH reducing valve 109 is transmitted to a CR(R) port of the D-INH valve 111 via the CR port and a CR(RVS) port of the manual valve 110, thereby moving the spool of the D-INH valve 111 leftward. The pressure CR discharged from the CLCH reducing valve 109 is also transmitted to the CR port of the RVS CPC valve 112, thereby moving the spool thereof leftward. As a result, the pressure CR input to a CR(R) port of the RVS CPC valve 112 is input into a CR(R) port of the servo valve 113, and the spool of the servo valve 113 moves rightward, thereby switching over the shifter S to the reverse side, that is, the direction of arrow R in FIG. 1.

Part of the pressure CR output from a CR(R) port of the servo valve 113 is transmitted to a CR(R) port of the SC-LUB shift valve 123, thus moving the spool thereof leftward. The remainder of the pressure CR output from a CR(R) port of the servo valve 113 is transmitted to a CR port of the RVS SCC valve 118 which is operated by the electronic control solenoid 117, via a CR(RVS) port and a CR(RVS, FWD) port of the manual valve 110, and becomes an initial pressure for the pressure RSC that operates the second clutch C2.

When the vehicle is driven in the reverse direction when operated under normal conditions, the vehicle is started in a state in which the toroidal type continuously variable transmission T is in the LOW ratio. At this point, the first clutch C1 is maintained in a non-engaged state and the second clutch C2 alone is engaged. The power transmission route in this case is shown by the bold line in FIG. 11C.

In other words, as shown in FIGS. 1 and 4, when the second clutch C2 is engaged, the torque of the engine E is transmitted to the driven wheels W via a route including the crankshaft 11, the damper 12, the input shaft 13 of the toroidal type continuously variable transmission T, the drive sprocket 17, the endless chain 19, the driven sprocket 18, the second clutch C2, the second shaft 15, the shifter S, the sixth helical gear 34, the eighth helical gear 36, the seventh helical gear 35, the third shaft 16, the final drive gear 46, the final driven gear 48, and the differential gear 47 in the above-detailed order, to thereby reverse the direction of the vehicle. During this period, rotation of the output gear 25 of the toroidal type continuously variable transmission T is input into the sun gear 39 of the planetary gear train P, output from the carrier 41 and transmitted to the sleeve 30 of the second shaft 15, but does not impede rotation of the second shaft 15 since the shifter S is switched over to the reverse side.

The torque of the engine E is thereby transmitted to the driven wheels W via the second clutch C2 without the torque passing through the toroidal type continuously variable transmission T and the first clutch C1 when the direction of the vehicle is reversed. When the vehicle starts to reverse, the load of the second clutch C2 increases since the second clutch C2 functions as a start clutch, but as described above, the leftward movement of the spool of the SC-LUB shift valve 123 supplies oil from the LUB port preferentially to a section of the second clutch C2 that is to be lubricated via the S-L port, and cooling is thus achieved.

(3) Vehicle Travels in the Forward Direction when a Failure has Occurred

When the electronic control system of the continuously variable transmission system fails, since the electronic control solenoids 104, 106, 115 and 117 cannot function, the above-mentioned control of the ratio of the toroidal type continuously variable transmission T cannot be carried out. In particular, in the case where the electronic control system fails when the vehicle is stationary, a load that changes the ratio of the toroidal type continuously variable transmission T beyond the LOW ratio or a load that changes the ratio beyond the OD ratio is applied to the toroidal type continuously variable transmission T when the vehicle starts, thereby creating the a possibility that the durability of the toroidal type continuously variable transmission T might be degraded. Furthermore, if the ratio is fixed at the OD ratio, the torque that is transmitted to the driven wheels W decreases, thereby creating the possibility that the starting performance will greatly degrade. In this embodiment, the above-mentioned problems are overcome by controlling the first clutch C1 and the second clutch C2 as will be described below for the case where the vehicle travels forward when a failure has occurred.

When the levels of current that are applied to the electronic control solenoid 104 of the +TC valve 105 and the electronic control solenoid 106 of the −TC valve 107 are zero (Ø) because of a failure in the electronic control system, the pressure +TC that is output from the +TC valve 105 is a maximum. When the pressure +TC is transmitted to a +TC port of the shift inhibitor valve 114, the spool thereof moves leftward, the first clutch C1 and the second clutch C2 are disconnected from the SC control valve 116 and the RVS SCC valve 118, respectively, and instead connected to the SC back up valve 119 and the RSC back up valve 120, respectively. When the spool of the shift inhibitor valve 114 moves leftward, the pressure CR that is input to the CR port thereof is output as a pressure SI from the SI port thereof, and the SI pressure is transmitted to both the SC shift valve 121 and the SC-LUB shift valve 123 to move their spools leftward.

When the spool of the SC shift valve 121 moves leftward, communication between the LUB port and the LUB' port thereof is cut off, and the oil that has been passing through the SC shift valve 121 passes through an orifice 124, to generate a difference between the pressure before and then after the orifice 124 according to an oil flow rate that corresponds to an amount discharged from the oil pump 102 related to the rotational rate of the engine. The above-mentioned pressure difference is transmitted to the LUB port and the LUB' port of the SC back up valve 119 to adjust the pressure CR to a pressure RSB related to the rotational rate of the engine, and is also transmitted to the LUB port and the LUB' port of the RSC back up valve 120 to adjust the pressure CR to a pressure RSB related to the rotational rate of the engine. In this case, the spool of the SC back up valve 119 moves leftward according to the tilt angle of the trunnions 73 of the toroidal type continuously variable transmission T, that is, the ratio of the toroidal type continuously variable transmission T, and the pressure SCB output by the SC back up valve 119 changes according to both the rotational rate of the engine and this ratio. More specifically, the higher the rotational rate of the engine and the lower the ratio of the toroidal type continuously variable transmission T, the higher the pressure SCB.

If the difference in rotational rate between the input discs 62 and the output discs 63 of the toroidal type continuously variable transmission T is in the range between the LOW ratio (2.415) and the OD ratio (0.415) when the vehicle starts to travel forward when a failure has occurred, it is possible to avoid an excessive load from being applied to the toroidal type continuously variable transmission T. However, if the first clutch C1 alone is engaged when the vehicle starts to travel in the forward direction, since the rotational rate of the ring gear 40 of the planetary gear train P connected to the stationary driven wheels W is zero (Ø), the sun gear 39 connected to the output gear 25 of the toroidal type continuously variable transmission T is braked due to being restrained by the ring gear 40, and the ratio tries to move beyond the LOW ratio so as to generate a high load. On the other hand, if the second clutch C2 alone is engaged when the vehicle starts to travel forward, since the rotational rate of the ring gear 40 of the planetary gear train P that is connected to the stationary driven wheels W is zero (Ø) and the rotation of the carrier 41 connected to the engine E increases, the rotation of the sun gear 39 is transmitted to the output gear 25 at a high speed, and the ratio tries to move beyond the OD ratio so as to cause a high load.

By setting the engagement forces of the first clutch C1 and the second clutch C2 so that a decrease in the rotational rate of the sun gear 39 due to engagement of the first clutch C1 is counterbalanced by an increase in the rotational rate of the carrier 41 due to engagement of the second clutch C2, the ratio of the toroidal type continuously variable transmission T can be maintained at a predetermined ratio (1.6 in this embodiment) between the LOW ratio and the OD ratio, to thereby prevent an excessive load from being applied to the toroidal type continuously variable transmission T.

For example, when there is a tendency for the ratio to change to the LOW ratio side from the predetermined ratio of 1.6, the pressure SCB transmitted from the SC back up valve 119 to the first clutch C1 is decreased so as to allow an increase in the rotational rate of the output gear 25 of the toroidal type continuously variable transmission T, thus preventing the ratio from changing to the LOW side from the predetermined ratio of 1.6. On the other hand, when there is a tendency for the ratio to change to the OD side from the predetermined ratio of 1.6, the pressure SCB transmitted from the SC back up valve 119 to the first clutch C1 is increased so as to restrict any increase in the rotational rate of the output gear 25 of the toroidal type continuously variable transmission T, thus preventing the ratio from changing to the OD side from the predetermined ratio of 1.6. The power transmission route in this case is shown by the bold lines in FIG. 12A.

In this embodiment, by preferentially controlling the engagement force of the first clutch C1 and setting the engagement force of the second clutch C2 to be, for example, 30% of the engagement force of the first clutch C1, the engagement forces of the first and second clutches C1 and C2 are gradually increased while maintaining the ratio at 1.6. During this period, since the rotational difference between the engine rotational rate and the rotational rate of the driven wheels W is mainly absorbed by slip in the second clutch C2, the second clutch C2 generates heat. However, since the spool of the SC-LUB shift valve 123 moves leftward due to the pressure SI in the same manner as in the above-mentioned case of reversing when the situation is normal, the oil from the LUB port is supplied preferably to a section of the second clutch C2 that is to be lubricated via the S-L port and cooling is thus achieved.

When the first clutch C1 is completely engaged as the vehicle speed increases, the ratio of the toroidal type continuously variable transmission T increases from the predetermined ratio of 1.6 to the OD ratio, and when the ratio reaches the OD ratio, the second clutch C2 is completely engaged. Subsequently, the vehicle is accelerated with the OD ratio as the engine rotational rate increases. The toroidal type continuously variable transmission T does not transmit torque while the ratio is changing from the predetermined ratio of 1.6 to the OD ratio. For example, if the rotational rate output from the toroidal type continuously variable transmission T is slightly smaller than the ratio at that time, a load is applied to the power rollers 66 so as to change the tilt angle, and the ratio of the toroidal type continuously variable transmission T changes in the direction in which the above-mentioned load is not applied. The toroidal type continuously variable transmission T thus automatically controls its ratio according to a change in the input and output rotational rates.

(4) Vehicle Travels in the Reverse Direction when a Failure of the Electronic Control System has Occurred Even when the vehicle travels in the reverse direction in a state in which the electronic control system of the continuously variable transmission system has failed, by transmitting the torque of the engine E to the driven wheels W via the second clutch C2 alone without the torque passing through the toroidal type continuously variable transmission T, the durability of the toroidal type continuously variable transmission T can be prevented from deteriorating. In this case, the pressure +TC also moves the spool of the shift inhibitor valve 114 leftward, and the second clutch C2 is thus disconnected from the RVS SCC valve 118 that is operated by the electronic control solenoid 117 and connected to the RCS back up valve 120 that outputs the pressure RSB according to the rotational rate of the engine E. The spool of the SERVO valve 113 moves rightward in the same manner as in the above-mentioned case where the vehicle travels in a reverse direction when the situation is normal, and the shifter S is switched over to the reverse side.

When the second clutch C2 is engaged while maintaining the first clutch C1 in a non-engaged state so as to reverse the vehicle, since the shifter S has been switched over to the reverse side, the torque of the engine E is transmitted to the driven wheels via the second clutch C2 without the torque passing through the toroidal type continuously variable transmission T. Application of an excessive load to the toroiidal type continuously variable transmission T is thus avoided in spite of the electronic control system failing. The power transmission route in this case is shown by the bold line in FIG. 12B.

The second embodiment of the present invention is now explained by reference to FIGS. 14 to 15B. The components of the present embodiment that corresponding to those in the first embodiment are denoted by the same reference symbols.

Although the planetary gear train P of the first embodiment shown in FIG. 1 is of a single pinion type, a planetary gear train P of the present embodiment is of a double pinion type. In the first embodiment, the output gear 25 of the toroidal type continuously variable transmission T is connected to the sun gear 39 of the planetary gear train P, whereas in the second embodiment, an output gear 25 of the toroidal type continuously variable transmission T, is connected to a carrier 41' of the planetary gear train P. Moreover, in the first embodiment, the driven wheels W are connected to the ring gear 40 of the planetary gear train P, whereas in the second embodiment, driven wheels W are connected to a sun gear 39' of the planetary gear train P. In the first embodiment, the second clutch C2 is connected to the carrier 40 of the planetary gear train P via the shifter S, whereas in the second embodiment a second clutch C2 is connected to a ring gear 40' of the planetary gear train P via a shifter S. The carrier 41', the sun gear 39', and the ring gear 40' of the planetary gear train P in the second embodiment correspond to a first element, a second element, and a third element of the present invention respectively.

Control of a first clutch C1, the second clutch C2 and the shifter S in the second embodiment is carried out in the same manner as in the first embodiment, and the same effects as those obtained in the first embodiment are obtained. The actions of traveling in the forward and reverse directions under normal operating conditions and when a failure of the electronic control system has occurred are explained briefly.

(1) Vehicle Travels in the Forward Direction Under Normal Conditions

When the vehicle travels in the forward direction under normal conditions, the vehicle is started in the direct mode in which the first clutch C1 alone is engaged. When the first clutch C1 is engaged, the ring gear 40' and the sun gear 39' are unified, thereby locking the planetary gear train P, and the shifter S moves to the forward side, that is, the direction of arrow F in FIG. 14. In this case, the torque of the engine E is transmitted to the driven wheels W via the toroidal type continuously variable transmission T and the first clutch C1. More specifically, the torque of the engine E is transmitted to the driven wheels W via a route including a crankshaft 11, a damper 12, an input shaft 13 of the toroidal type continuously variable transmission T, the output gear 25 of the toroidal type continuously variable transmission T, a first helical gear 23, a second helical gear 24, a third helical gear 27, a sleeve 26, the carrier 41' of the planetary gear train P, the sun gear 39' of the planetary gear train P, a third shaft 16, a final drive gear 46, a final driven gear 48, and a differential gear 47 in the above-detailed order, thus driving the vehicle forward. During this period, although rotation of the ring gear 40' of the planetary gear train P is transmitted to a clutch inner 38 of the second clutch C2 via a fifth helical gear 33, a fourth helical gear 31, a sleeve 30, the shifter S, and a second shaft 15 in the above-detailed order, since the second clutch C2 is in a non-engaged state, the clutch inner 38 does not impede a clutch outer 20 that is integral with the input shaft 13.

After the first clutch C1 is completely engaged, the vehicle is accelerated as the ratio of the toroidal type continuously variable transmission T changes from LOW to OD.

When the toroidal type continuously variable transmission T reaches the OD ratio, by disengaging the first clutch C1 which has been in an engaged state and changing the ratio of the toroidal type continuously variable transmission T from OD to LOW while engaging the second clutch C2 which has been in a non-engaged state, the ratio of the entire continuously variable transmission system is changed beyond the OD ratio in the torque slip mode. In the torque slip mode, the torque of the engine E is transmitted to the ring gear 40' of the planetary gear train P via a route including the crankshaft 11, the damper 12, the input shaft 13 of the toroidal type continuously variable transmission T, a drive sprocket 17, an endless chain 19, a driven sprocket 18, the clutch outer 20 of the second clutch C2, the clutch inner 38 of the second clutch C2, the second shaft 15, the shifter S, the sleeve 30, the fourth helical gear 31 and the fifth helical gear 33 in that order. A majority of the torque that has been transmitted to the ring gear 40' of the planetary gear train P is transmitted to the driven wheels W by a route including the ring gear 40', pinions 43o, pinions 43i, the sun gear 39', the third shaft 16, the final drive gear 46, the final driven gear 48, and the differential gear 47 in the above-detailed order, thus driving the vehicle forward. A portion of the torque that has been transmitted to the ring gear 40' of the planetary gear train P is transmitted back to the input shaft 13 of the toroidal type continuously variable transmission T via a route including the ring gear 40', the carrier 41', the sleeve 26, the third helical gear 27, the second helical gear 24, the first helical gear 23, and the output gear 25 in the above-detailed order, and then from there to the driven wheels W via the above-mentioned route including the second clutch C2.

(2) Vehicle Travels in Reverse Direction Under Normal Conditions

Figure 14:
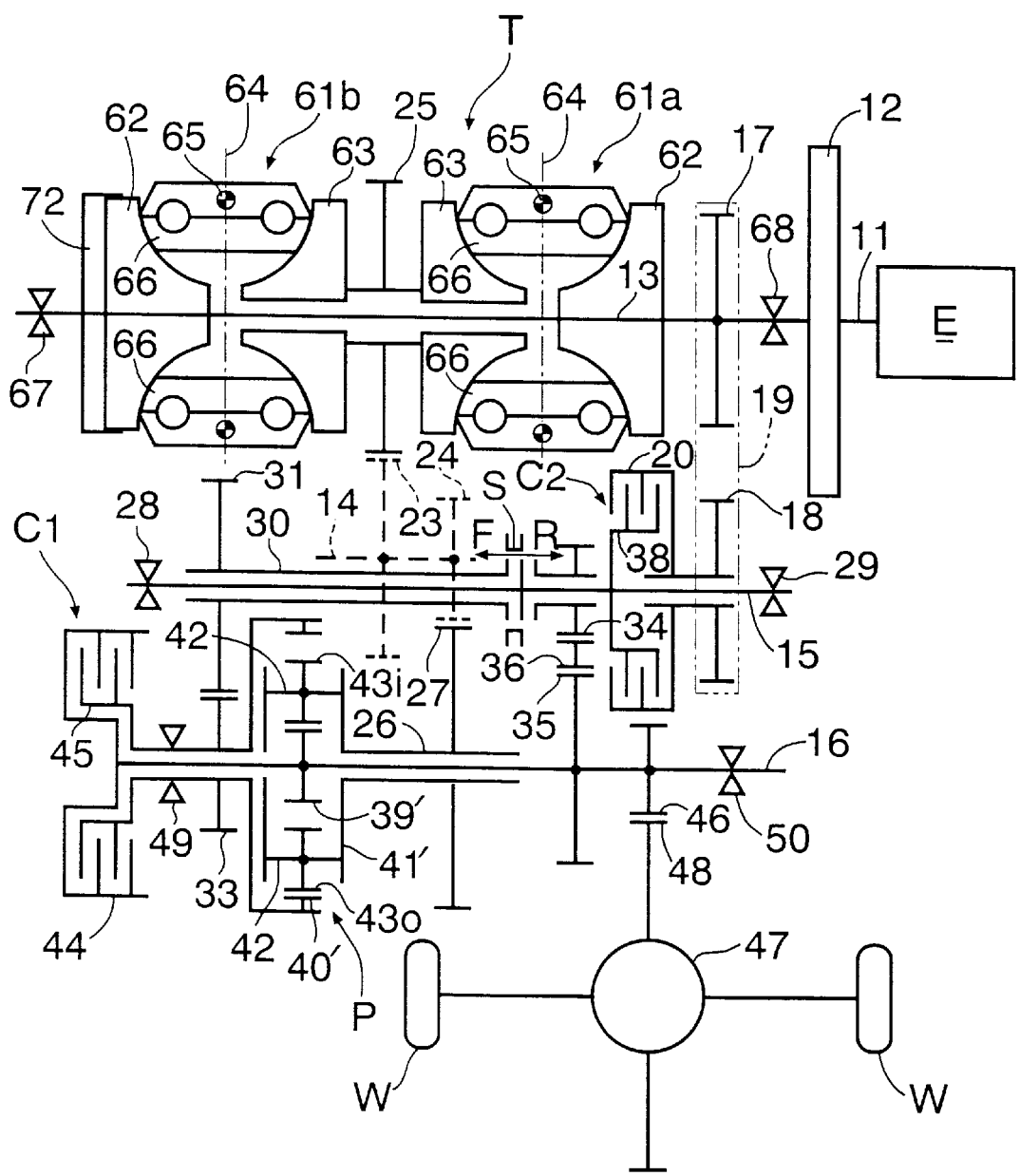
Figure 15A:
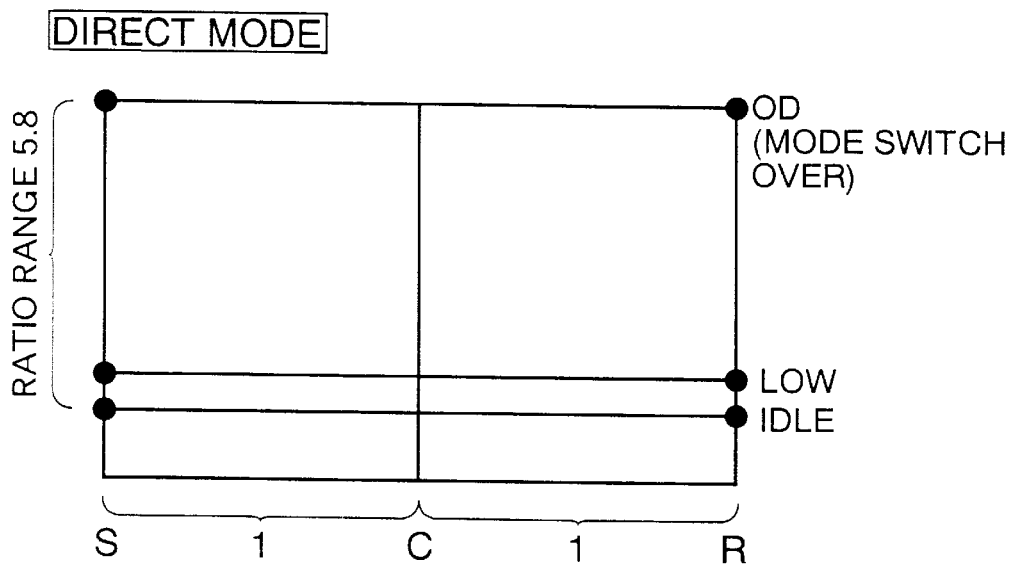
Figure 15B:
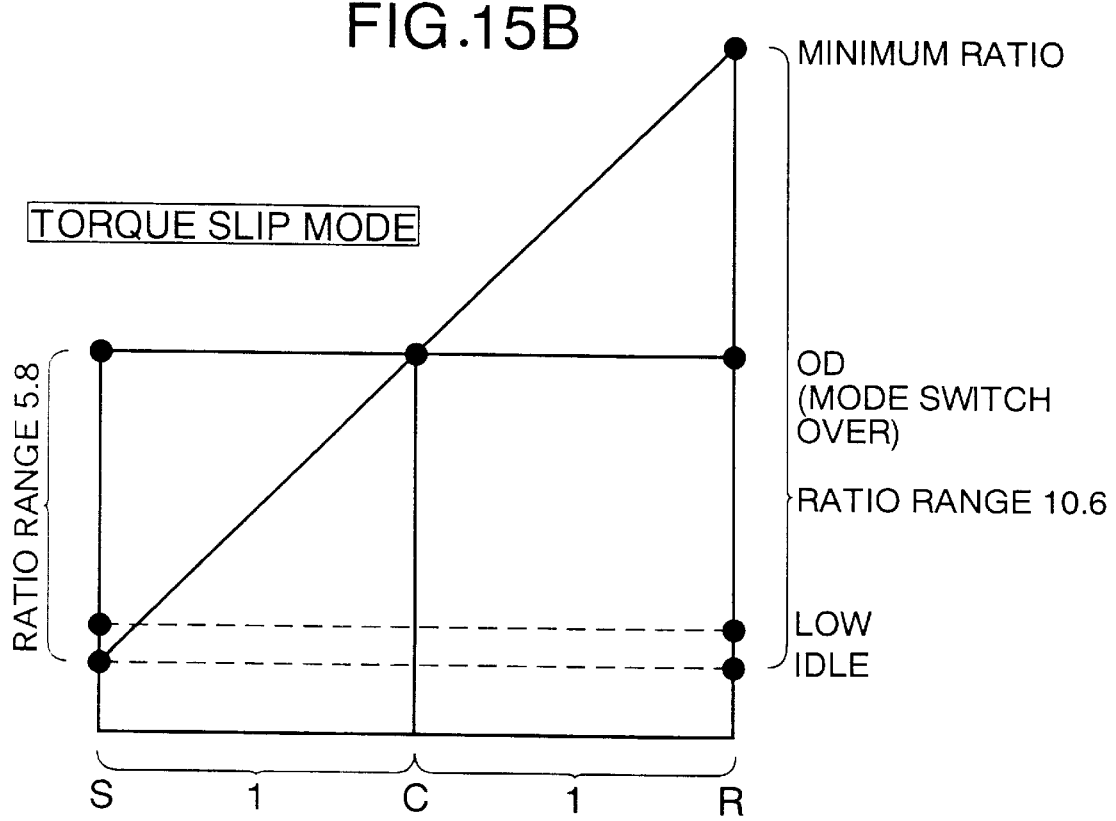

When the vehicle travels in the reverse direction under normal conditions, the second clutch C2 alone is engaged while maintaining the first clutch C1 in a non-engaged state with the shifter S switched over to the reverse side, that is, the direction of arrow R in FIG. 14. The torque of the engine E is thus transmitted to the driven wheels W via a route including the crankshaft 11, the damper 12, the input shaft 13 of the toroidal type continuously variable transmission T, the drive sprocket 17, the endless chain 19, the driven sprocket 18, the second clutch C2, the second shaft 15, the shifter S, the sixth helical gear 34, the eighth helical gear 36, the seventh helical gear 35, the third shaft 16, the final drive gear 46, the final driven gear 48 and the differential gear 47 in the above-detailed order to reverse the traveling direction of the vehicle. During this period, rotation of the output gear 25 of the toroidal type continuously variable transmission T is input into the carrier 41' of the planetary gear train P and output from the ring gear 40', but since the shifter S has been switched over to the reverse side, this does not cause any impediment.

(3) Vehicle Travels in the Forward Direction when a Failure of the Electronic Control System has Occurred When the electronic control system of the continuously variable transmission system fails, by setting the engagement forces for the first clutch C1 and the second clutch C2 so that a decrease in the rotational rate of the ring gear 40' due to engagement of the first clutch C1 is counterbalanced by an increase in the rotational rate of the ring gear 40' due to engagement of the second clutch C2, the ratio of the toroidal type continuously variable transmission T can be maintained at a predetermined ratio (1.6 in this embodiment) between the LOW ratio and the OD ratio so as to prevent an excessive load from being applied to the toroidal type continuously variable transmission T. That is, by connecting the clutch inner 38 of the second clutch C2 to the ring gear 40' of the planetary gear train P by the shifter S and gradually engaging the first clutch C1 and the second clutch C2 with predetermined engagement forces, the ratio of the toroidal type continuously variable transmission T can be controlled so as not to change beyond either the LOW ratio or the OD ratio. When the first clutch C1 is completely engaged, the ratio of the toroidal type continuously variable transmission T changes from the above-mentioned predetermined ratio to the OD ratio, and subsequently when the second clutch C2 is completely engaged, the rotational rate of the engine E is increased while maintaining the ratio of the toroidal type continuously variable transmission T at the OD ratio, thus accelerating the vehicle. During this period, the torque of the engine E is transmitted to the driven wheels W via the second clutch C2, the shifter S, and the planetary gear train P. Therefore, the toroidal type continuously variable transmission T only carries out speed change and is not involved in torque transmission.

(4) Vehicle Travels in the Reverse Direction when a Failure of the Electronic Control System has Occurred Also in the case where the vehicle is traveling in reverse in a state in which the electronic control system of the continuously variable transmission system has failed, by transmitting the torque of the engine E to the driven wheels W via the second clutch C2 alone without the torque passing through the toroidal type continuously variable transmission T in the same way as when the operating conditions are normal, the durability of the toroidal type continuously variable transmission T can be prevented from deteriorating.

In accordance with the present embodiment, the ratio range of the entire continuously variable transmission system can be widened from 8.7 as in the first embodiment to 10.6 while maintaining the ratio range of the planetary gear train P at 5.8 as in the first embodiment. The other actions and effects of the second embodiment are the same as the above-mentioned actions and effects of the first embodiments.

The third embodiment of the present invention is now explained with reference to FIG. 16.

The continuously variable transmission systems of the first and second embodiments are suitable for front engined front wheel drive vehicles in which the engine E is placed laterally. However, the continuously variable transmission system of the present embodiment is suitable for a front engined rear wheel drive vehicle in which the engine E is mounted longitudinally. The components of the present embodiment that correspond to those in the first and second embodiments are denoted using the same reference symbols.

A first shaft 131 and a second shaft 132 are placed coaxially with an input shaft 13 of a toroidal type continuously variable transmission T. The first shaft 131 rotates integrally with the input shaft 13, and the second shaft 132 is connected to driven wheels W (not illustrated). A third shaft 133 and a fourth shaft 134 are placed in parallel to the first shaft 131 and the second shaft 132. A first helical gear 135 and a second helical gear 136 are fixed to the third shaft 133. A third helical gear 137 and a fourth helical gear 138 are fixed to the fourth shaft 134. The first helical gear 135 on the third shaft 133 meshes with an output gear 25 of the toroidal type continuously variable transmission T. The second helical gear 136 thereon meshes with a fifth helical gear 139 integral with a carrier 41' of a planetary gear train P and a clutch inner 45 of a first clutch C1. A clutch outer 20 of a second clutch C2 is fixed to the first shaft 131, and a clutch inner 38 thereof is fixed to a sleeve 140 fitted around the outer periphery of the first shaft 131. When the second clutch C2 is engaged, the first shaft 131 is therefore connected to the sleeve 140. A sixth helical gear 142 provided on a sleeve 141 fitted around the outer periphery of the sleeve 140 meshes with the third helical gear 137 on the fourth shaft 134 via a seventh helical gear 143. The fourth helical gear 138 on the fourth shaft 134 meshes with an eighth helical gear 144 on the second shaft 132.

Figure 16:
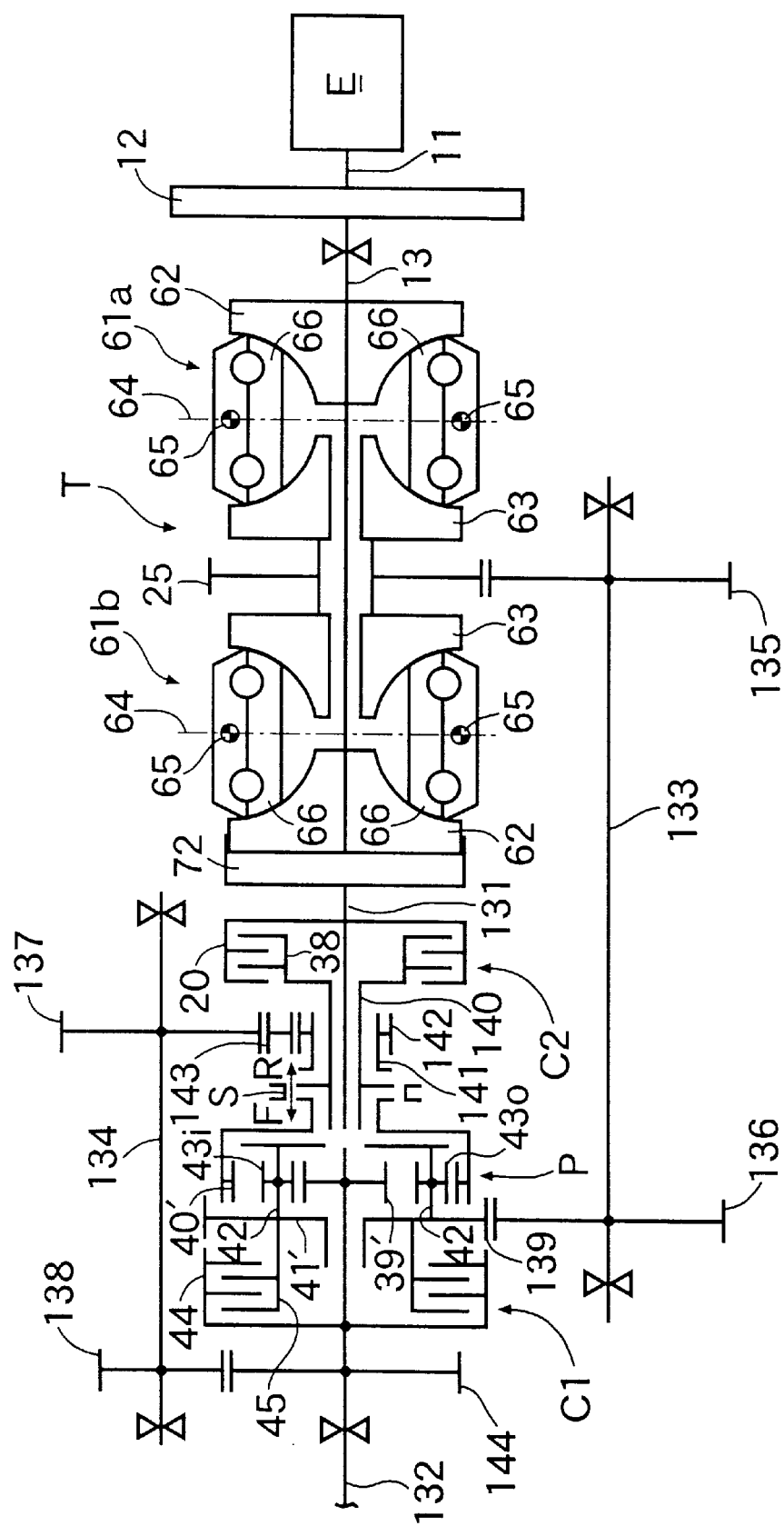
FIG. 16 is a schematic diagram of a continuously variable transmission system relating to a third embodiment of the present invention.

When a shifter S moves to the forward side, that is, the direction of arrow F in FIG. 16, a ring gear 40' of the planetary gear train P is connected to the sleeve 140, and when the shifter S moves to the reverse side, that is, the direction of arrow R in FIG. 16, the sixth helical gear 142 is connected to the sleeve 140. A clutch outer 44 of the first clutch C1 is integral with the second shaft 132, and when the first clutch C1 is engaged, the carrier 41' of the planetary gear train P becomes integral with a sun gear 39' via the second shaft 132, thereby locking the planetary gear train P.

The carrier 41', the sun gear 39' and the ring gear 40' of the planetary gear train P in the third embodiment correspond to a first element, a second element, and a third element of the present invention, respectively.

Control of the first clutch C1, the second clutch C2 and the shifter S in the third embodiment is carried out in the same manner as in the first embodiment, and the same effects as those obtained in the first embodiment can be obtained. The actions of traveling in the forward and reverse directions under normal operating conditions and when a failure of the electronic system has occurred are explained briefly below.

(1) Vehicle Travels in the Forward Direction Under Normal Conditions

When the vehicle travels in the forward direction under normal conditions, the vehicle is started in the direct mode where the first clutch C1 alone is engaged. When the first clutch C1 is engaged, the carrier 41' and the sun gear 39' are unified, thereby locking the planetary gear train P, and the shifter S moves to the forward side, that is, the direction of arrow F in FIG. 16. In this case, the torque of the engine E is transmitted to the driven wheels W via the toroidal type continuously variable transmission T and the first clutch C1. More specifically, the torque of the engine E is transmitted to the driven wheels W via a route including the crankshaft 11, the damper 12, the input shaft 13 of the toroidal type continuously variable transmission T, the output gear 25 of the toroidal type continuously variable transmission T, the first helical gear 135, the third shaft 133, the second helical gear 136, the fifth helical gear 139, the first clutch C1 and the second shaft 132 in the above-detailed order, thus driving the vehicle forward. During this period, although rotation of the carrier 41' of the planetary gear train P is transmitted to the clutch inner 38 of the second clutch C2 via the ring gear 40', the shifter S and the sleeve 140 in the above-detailed order, since the second clutch C2 is in a non-engaged state, the clutch inner 38 does not impede the clutch outer 20 integral with the input shaft 13.

After the first clutch C1 is completely engaged, the vehicle is accelerated as the ratio of the toroidal type continuously variable transmission T changes from LOW to OD.

When the toroidal type continuously variable transmission T reaches the OD ratio, by disengaging the first clutch C1 which has been in an engaged state and changing the ratio of the toroidal type continuously variable transmission T from OD to LOW while engaging the second clutch C2 which has been in a non-engaged state, the ratio of the entire continuously variable transmission system is changed beyond the OD ratio in the torque slip mode. In the torque slip mode, the torque of the engine E is transmitted to the ring gear 40' of the planetary gear train P via a route including the crankshaft 11, the damper 12, the input shaft 13 of the toroidal type continuously variable transmission T, the first shaft 131, the clutch outer 20 of the second clutch C2, the clutch inner 38 of the second clutch C2, the sleeve 140, and the shifter S in the above-detailed order. A majority of the torque that has been transmitted to the ring gear 40' of the planetary gear train P is transmitted to the driven wheels W by a route including the carrier 41', the sun gear 39', and the second shaft 132 in that order, thus driving the vehicle forward. A portion of the torque that has been transmitted to the ring gear 40' of the planetary gear train P is transmitted back to the input shaft 13 of the toroidal type continuously variable transmission T via a route including the carrier 41', the fifth helical gear 139, the second helical gear 136, the third shaft 133, the first helical gear 135, and the output gear 25 in the above-detailed order, and from there to the driven wheels W via the above-mentioned route including the second clutch C2.

(2) Vehicle Travels in the Reverse Direction Under Normal Conditions

When the vehicle travels in the reverse direction under normal conditions, the second clutch C2 alone is engaged while the first clutch C1 is maintained in a non-engaged state with the shifter S switched over to the reverse side, that is, the direction of arrow R in FIG. 16. The torque of the engine E is thus transmitted to the driven wheels W via a route including the crankshaft 11, the damper 12, the input shaft 13 of the toroidal type continuously variable transmission T, the first shaft 131, the second clutch C2, the sleeve 140, the shifter S, the sixth helical gear 142, the seventh helical gear 143, the third helical gear 137, the fourth shaft 134, the fourth helical gear 138, the eighth helical gear 144, and the second shaft 132 in the above-detailed order so as to reverse the traveling direction of the vehicle. During this period, rotation of the output gear 25 of the toroidal type continuously variable transmission T is input into the carrier 41' of the planetary gear train P and output from the ring gear 40', but since the shifter has been switched over to the reverse side, this does not cause any impediment.

(3) Vehicle Travels in the Forward Direction when a Failure of the Electronic Control System has Occurred When the electronic control system of the continuously variable transmission system fails, by setting the engagement forces for the first clutch C1 and the second clutch C2 so that a decrease in the rotational rate of the carrier 41' due to engagement of the first clutch C1 is counterbalanced by an increase in the rotational rate of the ring gear 40' due to engagement of the second clutch C2, the ratio of the toroidal type continuously variable transmission T can be maintained at a predetermined ratio (1.6 in this embodiment) between the LOW ratio and the OD ratio, thereby preventing an excessive load from being applied to the toroidal type continuously variable transmission T. That is, by connecting the clutch inner 38 of the second clutch C2 to the ring gear 40' of the planetary gear train P by the shifter S, and gradually engaging the first clutch C1 and the second clutch C2 with predetermined engagement forces, the ratio of the toroidal type continuously variable transmission T is controlled so as not to change beyond either the LOW ratio or the OD ratio. When the first clutch C1 is completely engaged, the ratio of the toroidal type continuously variable transmission T changes from the above-mentioned predetermined ratio to the OD ratio, and subsequently when the second clutch C2 is completely engaged, the rotational rate of the engine E is increased while maintaining the ratio of the toroidal type continuously variable transmission T at the OD ratio, thereby accelerating the vehicle. During this period, the torque of the engine E is transmitted to the driven wheels W via the second clutch C2, the shifter S and the planetary gear train P. Therefore, the toroidal type continuously variable transmission T only carries out speed change and is not involved in torque transmission.

(4) Vehicle Travels in the Reverse Direction when a Failure of the Electronic Control System has Occurred Also in the case where the vehicle reverses in a state in which the electronic control system of the continuously variable transmission system has failed, by transmitting the torque of the engine E to the driven wheels W via the second clutch C2 alone without the torque passing through the toroidal type continuously variable transmission T in the same manner as when the operating conditions are normal, the durability of the toroidal type continuously variable transmission T can be prevented from deteriorating.

In accordance with the third embodiment, the same functional effects can be obtained as in the above-mentioned first and second embodiments.

Although the embodiments of the present invention have been explained in detail above, the present invention can be modified in a variety of ways without departing from the spirit and scope of the invention.

For example, in the present embodiments, a toroidal type continuously variable transmission T of a double cavity type is illustrated, but the present invention can be applied to a toroidal type continuously variable transmission of a single cavity type and also to a continuously variable transmission other than the toroidal type continuously variable transmissions. Furthermore, the relationships of the sun gear, the ring gear and the carrier of the planetary gear train P to the first to third elements can be chosen appropriately.

What is claimed is:

1. A continuously variable transmission system for a vehicle comprising:

a continuously variable transmission having an input member into which a torque of an engine is input and an output member to change the speed of rotation of the input member and to output the rotation;

a planetary gear train having a first element, a second element and a third element, the first element being connected to the output member of the continuously variable transmission and the second element being connected to driven wheels of the vehicle;

a first clutch to engage the first element of the planetary gear train with the second element thereof;

a second clutch whose input side is connected to the engine; and a shifter that provides a connection between the output side of the second clutch and the third element of the planetary gear train when the vehicle travels in a forward direction and a connection between the output side of the second clutch and the driven wheels when the vehicle travels in the reverse direction.

* * * * *